(12) United States Patent
Kamogi et al.

(10) Patent No.: US 11,996,735 B2
(45) Date of Patent: May 28, 2024

(54) MOTOR

(71) Applicant: MINEBEA MITSUMI Inc., Nagano (JP)

(72) Inventors: Yutaka Kamogi, Nagano (JP);
Tomohisa Suzuki, Nagano (JP);
Masaki Kagawa, Nagano (JP)

(73) Assignee: MINEBEA MITSUMI Inc., Nagano (JP)

( * ) Notice: Subject to any disclaimer, the term of this patent is extended or adjusted under 35 U.S.C. 154(b) by 202 days.

(21) Appl. No.: 17/269,694

(22) PCT Filed: May 31, 2019

(86) PCT No.: PCT/JP2019/021748
§ 371 (c)(1),
(2) Date: Feb. 19, 2021

(87) PCT Pub. No.: WO2020/039682
PCT Pub. Date: Feb. 27, 2020

(65) Prior Publication Data
US 2021/0320539 A1   Oct. 14, 2021

(30) Foreign Application Priority Data

Aug. 24, 2018 (JP) ................. 2018-157659
Aug. 24, 2018 (JP) ................. 2018-157660
Aug. 24, 2018 (JP) ................. 2018-157661

(51) Int. Cl.
*H02K 1/18* (2006.01)
*H02K 1/14* (2006.01)
(Continued)

(52) U.S. Cl.
CPC ............... *H02K 1/18* (2013.01); *H02K 1/148* (2013.01); *H02K 15/02* (2013.01); *H02K 15/095* (2013.01); *H02K 15/10* (2013.01); *H02K 15/12* (2013.01)

(58) Field of Classification Search
CPC ......... H02K 15/02; H02K 15/10; H02K 15/12
(Continued)

(56) References Cited

U.S. PATENT DOCUMENTS 6,226,856 B1   5/2001   Kazama et al.
6,265,804 B1   7/2001   Nitta et al.
(Continued)

FOREIGN PATENT DOCUMENTS

CN   1178410 A   4/1998
CN   1889338 A   1/2007
(Continued)

OTHER PUBLICATIONS

International Search Report for corresponding International Application No. PCT/JP2019/021748 dated Jul. 16, 2019.
(Continued)

*Primary Examiner* — Jose A Gonzalez Quinones
(74) *Attorney, Agent, or Firm* — Pearne & Gordon LLP

(57) ABSTRACT

A motor according to an embodiment includes a stator. The stator includes a plurality of connection cores. The connection core includes a plurality of pieces connected via connection portions. The plurality of pieces are arranged in a circular arc shape. The plurality of connection cores are arranged in an annular shape.

8 Claims, 28 Drawing Sheets

(51) Int. Cl.
  *H02K 15/02* (2006.01)
  *H02K 15/095* (2006.01)
  *H02K 15/10* (2006.01)
  *H02K 15/12* (2006.01)
(58) Field of Classification Search
  USPC ............... 310/216.076, 216.088, 216.089
  See application file for complete search history.

(56) References Cited

U.S. PATENT DOCUMENTS

| | | | |
|---|---|---|---|
| 6,504,284 | B1 | 1/2003 | Kazama et al. |
| 6,658,721 | B2 | 12/2003 | Kazama et al. |
| 7,626,304 | B2 | 12/2009 | Morioka et al. |
| 10,848,018 | B2 | 11/2020 | Otsubo et al. |
| 2001/0005933 | A1 | 7/2001 | Kazama et al. |
| 2008/0315710 | A1 | 12/2008 | Morioka et al. |
| 2011/0020154 | A1* | 1/2011 | Matsuda ............... H02K 3/325 310/43 |
| 2015/0333577 | A1* | 11/2015 | Jang ...................... H02K 1/148 29/596 |
| 2019/0052130 | A1 | 2/2019 | Otsubo et al. |

FOREIGN PATENT DOCUMENTS

| | | | |
|---|---|---|---|
| CN | 101030712 A | 9/2007 | |
| CN | 101164218 A | 4/2008 | |
| CN | 101442224 A | 5/2009 | |
| CN | 201298796 Y | 8/2009 | |
| CN | 202455169 U | 9/2012 | |
| CN | 102868239 A | 1/2013 | |
| CN | 103812236 A | 5/2014 | |
| CN | 105490410 A | 4/2016 | |
| CN | 106571698 A | 4/2017 | |
| CN | 107332366 A | 11/2017 | |
| CN | 107979193 A | 5/2018 | |
| CN | 207475294 U | 6/2018 | |
| JP | 08-047185 A | 2/1996 | |
| JP | 2000-152529 A | 5/2000 | |
| JP | 2000209796 A * | 7/2000 | |
| JP | 2005-245138 A | 9/2005 | |
| JP | 2005245138 A * | 9/2005 | |
| JP | 2007-282498 A | 10/2007 | |
| JP | 2010-178426 A | 8/2010 | |
| JP | 2013-094059 A | 5/2013 | |
| JP | 2013094059 A * | 5/2013 | |
| JP | 2014-183631 A | 9/2014 | |
| JP | 2015171239 A * | 9/2015 | |
| WO | WO-2007029882 A1 * | 3/2007 | ............ H02K 1/148 |
| WO | WO-2018008880 A1 * | 1/2018 | |
| WO | WO-2018230384 A1 * | 12/2018 | .......... B25D 11/125 |
| WO | WO-2022249525 A1 * | 12/2022 | |

OTHER PUBLICATIONS

Written Opinion for corresponding International Application No. PCT/JP2019/021748 dated Jul. 16, 2019.
English translation of the Written Opinion for corresponding International Application No. PCT/JP2019/021748 dated Jul. 16, 2109.
Notice of Reasons for Refusal dated Feb. 28, 2023 for corresponding Japanese Application No. 2020-538183 and English translation.
First Office Action dated Mar. 22, 2024 for corresponding Chinese Application No. CN201980056301.7 and English translation.

* cited by examiner

MOTOR

TECHNICAL FIELD

The present disclosure relates to a motor.

BACKGROUND

Conventionally, there is known a motor in which a stator is formed of three segments and the total number of windings and the number of salient poles in each segment are adjusted to prevent noise caused by vibration.

DESCRIPTION OF THE RELATED ART

Patent Document

[Patent Document 1] Japanese Unexamined Patent Application Publication No. 2000-152529

SUMMARY

Problems to be Solved

However, in the conventional stator formed with a plurality of segments, since the segments are formed in a circular arc shape, for example, the space around the teeth is narrow, so that it is difficult to wind the coils and productivity cannot be improved.

The present disclosure takes the above problem as an example, and an object of the present invention is to reduce the vibration of the stator and improve the productivity.

Means for Solving the Problem

A motor according to an aspect of the present disclosure includes a stator. The stator includes a plurality of connection cores. The connection core includes a plurality of pieces connected via connection portions. The plurality of pieces are arranged in a circular arc shape. The plurality of connection cores are arranged in an annular shape.

According to an aspect of the present disclosure, it is possible to reduce the vibration of the stator and improve the productivity.

DETAILED DESCRIPTION

Figure 1:
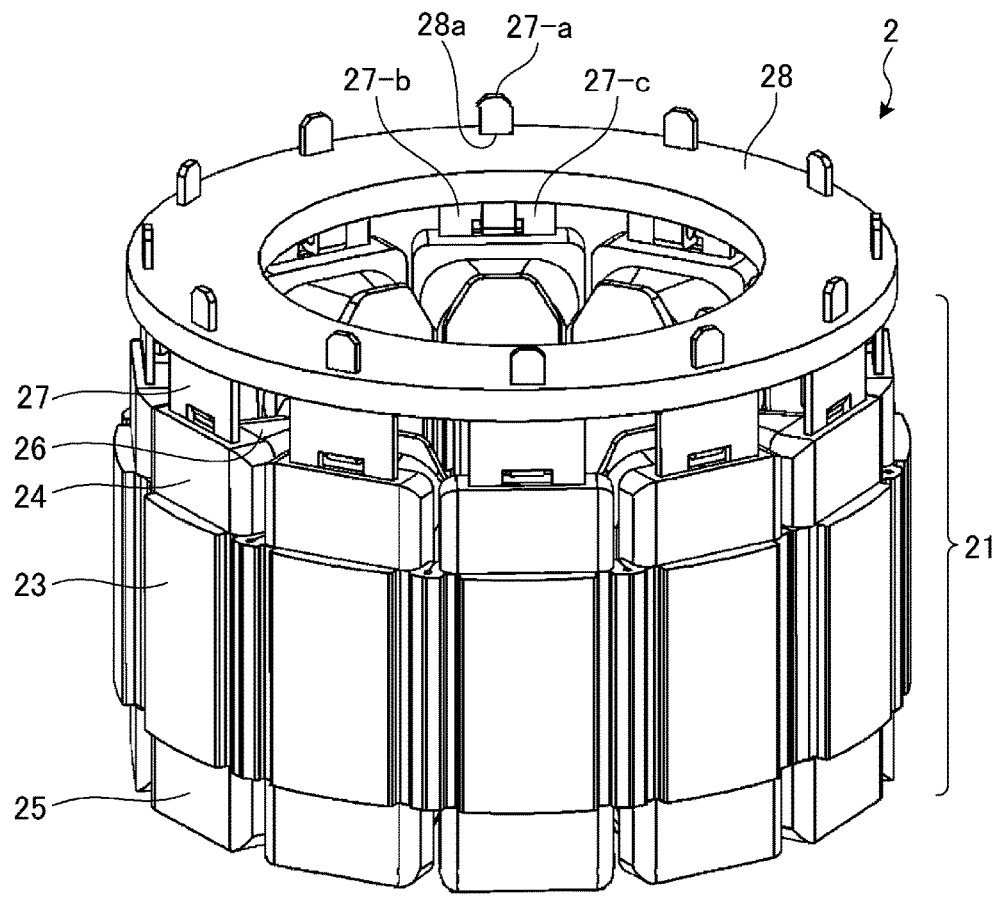
FIG. 1 is a perspective view showing a configuration example of a stator according to a first embodiment.

Hereinafter, the motor and the method for manufacturing the motor according to the embodiments will be described with reference to the drawings. It is to be noted that the present disclosure is not limited to the embodiments. In addition, the relationship between the dimensions of each element in the drawings, the scale of each element, and the like may differ from reality. Even between drawings, there may be portions with different dimensional relationships and scales. Further, in principle, the contents described in one embodiment or modifications are similarly applied to other embodiments or modifications.

First Embodiment

FIG. 1 is a perspective view showing a configuration example of a stator 2 according to the first embodiment. In FIG. 1, a stator 21 and an annular substrate (hereinafter, referred to as a connecting plate) 28 provided at the stator 21 are shown. In the stator 21, after a coil 26 is wound with an upper side insulator 24 and a lower side insulator 25 mounted on each piece of a connection core 23 in which a plurality of (for example, four) pieces are connected via bendable connection portions, the connection portions are bent to form the stator 21 having an annular shape by a plurality of (for example, three) connection cores 23. Here, an insulator is configured by the upper side insulator 24 and the lower side insulator 25. Each of the connection cores 23 is used as a segment to form a core as the entire stator. When three connection cores 23 are used, the number of the segments is three. The number of the segments is preferably 3 in order to increase the rigidity with respect to the second-order/fourth-order annular vibration modes, but may be an odd number of 3 or more. Further, the number of the pieces included in the plurality of connection cores 23 may be an even number, and the number of the plurality of connection cores 23 may be an odd number or a prime number. Even the number of the pieces is an even number, the vibration of the motor and the noise caused by the vibration can be suppressed by setting the number of the connection cores 23 to an odd number or a prime number of 3 or more.

The connecting plate 28 is for collectively wiring the terminals 27 provided at the upper portions of the upper side insulators 24 for respective pieces (for respective slots) of the connection core 23, and is formed of a printed circuit board or a predetermined substrate provided with a printed circuit board or a flexible board. It is to be noted that the connecting plate 28 may be connected to the terminals 27 after the connection core 23 temporarily assembled in the annular shape with the coils 26 wound is inserted into the housing. The electrical connections of the coils 26 of the respective slots are collectively implemented by the connection plate 28 via the terminals 27, so that jumper wires do not intersect each other. Further, a guide portion at the insulator for guiding the jumper wire becomes unnecessary, whereby the dimension of the stator in the rotation axis direction can be shortened, and the dead space of the motor can be reduced. In the illustrated example, the end portion 27-a of the terminal 27 is inserted into each of a plurality of hole portions 28a formed in the connecting plate 28, and a part of the end portion 27-a of the terminal 27 projects outward from the surface of the connecting plate 28. The end portion 27-a of the terminal 27 is electrically connected to a part of the wiring formed on the connecting plate 28. Projecting portions 27-b and 27-c fixed to the insulator are connected to the end portion 27-a.

Figure 2:
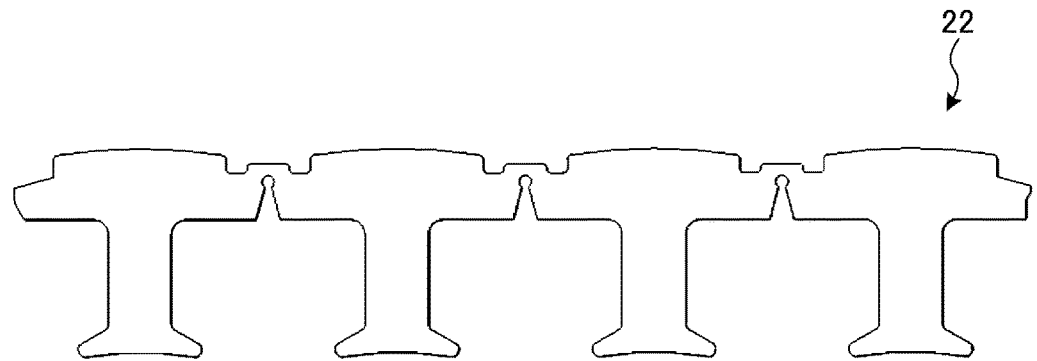
FIG. 2 is a plan view showing an example of a steel plate as a magnetic body constituting a connection core.

FIG. 2 is a plan view showing an example of a steel plate 22 as a magnetic body constituting the connection core 23. In FIG. 2, the steel plate 22 is formed by punching an electromagnetic steel sheet with a die or the like. In addition, a plurality of steel plates 22 are stacked to formed the connection core 23.

Figure 3A:
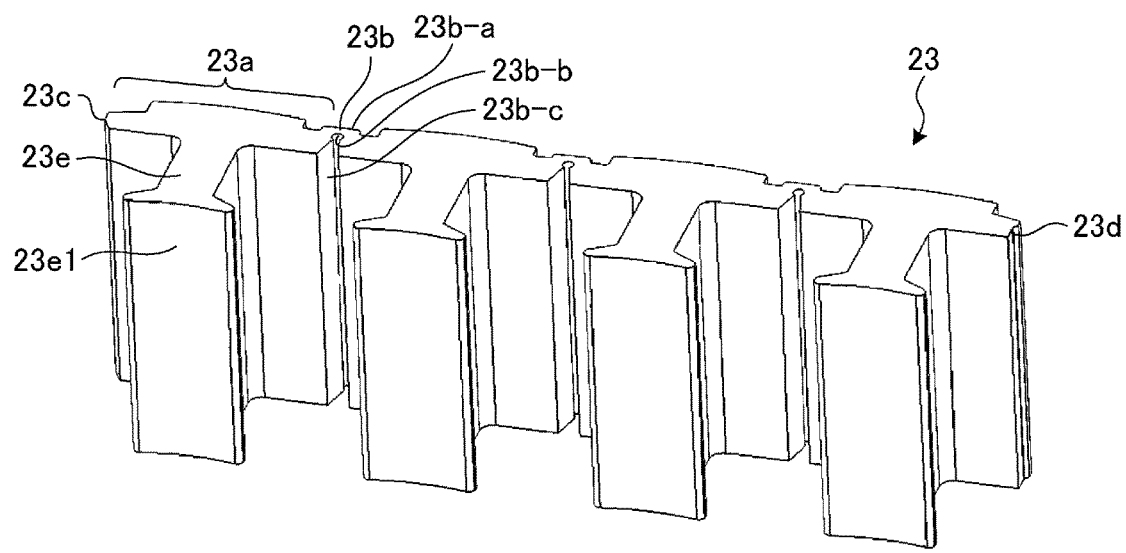
FIG. 3A is a perspective view showing an example of the shape of the connection core.
Figure 3B:
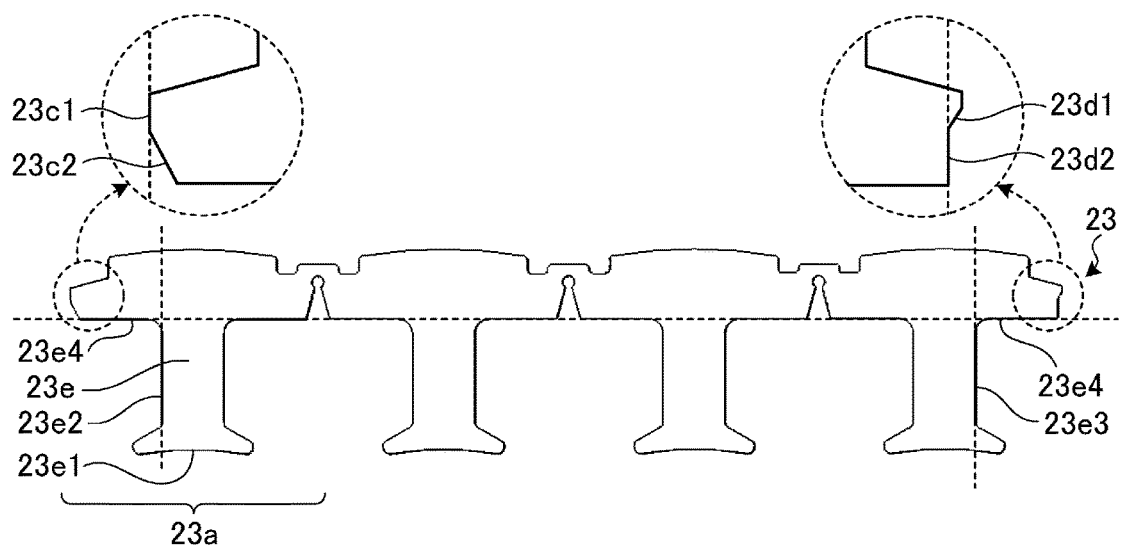
FIG. 3B is a plan view showing an example of the shape of the connection core.

FIG. 3A is a perspective view showing an example of the shape of the connection core 23, and FIG. 3B is a plan view showing an example of the shape of the connection core 23. In FIG. 3B, an enlarged view of both end portions of the connection core 23 is added. The connection core 23 is formed by stacking a plurality of steel plates 22 as the magnetic body shown in FIG. 2. It is to be noted that, in FIG. 3A, the horizontal stripes on the end surface that appear due to the stacking of the electromagnetic steel sheets are not shown. In the illustrated example, four pieces 23a with a substantially T-shaped planar shape are connected via connection portions 23b. Each piece 23a is formed with a tooth 23e. One end portion 23e1 of this tooth 23e (the end portion facing the rotor 3 in the radial direction) serves as a magnetic pole portion. The connection portion 23b is formed thinly between a planar edge 23b-a located on the outer peripheral side and a curved recess portion 23b-b located on the inner peripheral side, and can be easily bent in a direction in which the curved recess portion 23b-b is closed. In other words, the recess portion 23b-b is provided at the side portion of the connection portion 23b. A planar contact portion 23b-c is connected to the curved recess portion 23b-b, and comes into contact with a contact portion 23b-c of the adjacent piece 23a when the connection core 23 is bent. The left and right end portions of the connection core 23 are contact portions 23c and 23d, and are in contact with and fitted to the contact portions 23d and 23c of the adjacent connection core 23 in a state of being bent in an annular shape.

The surface of the contact portion 23c has a first surface 23c1 extending in a direction along the side surface 23e2 of the tooth 23e and a second surface 23c2 inclined with respect to the first surface 23c1. In the radial direction, the first surface 23c1 is arranged on the outer side (tubular portion 11 side) with respect to the second surface 23c2. This first surface 23c1 extends in a direction perpendicular to the direction in which each of the pieces 23a is lined up in a state where each of the pieces 23a is opened and the connection core 23 is linear. Further, each of the first surface 23c1 and the second surface 23c2 is a surface that intersects a surface extending in the radial direction from the contact portion 23c and passing through the center of the shaft (center position of the motor) when the connection core 23 is bent in an annular shape. On the other hand, the contact portion 23d includes a surface corresponding to the contact portion 23c of the other connection core 23, and has a second surface 23d2 extending in a direction along a side surface 23e3 of the tooth 23e, and a first surface 23d1 inclined with respect to the second surface 23d2. The first surface 23d1 faces the first surface 23c1 of the contact portion 23c, and the second surface 23d2 faces the second surface 23c2. In the radial direction, the first surface 23d1 is arranged on the outer side (tubular portion 11 side) with respect to the second surface 23d2. This second surface 23d2 extends in a direction perpendicular to the direction in which each of the pieces 23a is lined up in a state where each of the pieces 23a is opened and the connection core 23 is linear. Further, the first surface 23d1 and the second surface 23d2 becomes surfaces that intersect a surface extending in the radial direction from the contact portion 23d and passing through the center of the shaft (center position of the motor) along the radial direction when the connection core 23 is bent in an annular shape. In this way, among the plurality of connection cores 23, two connection cores 23 that are in contact with each other respectively include contact portions 23c and 23d, and the contact portions 23c and 23d of the two connection cores 23 are provided with surfaces intersecting a surface extending in the radical direction and passing through the center of the shaft (see FIG. 14C), so that the contact portions 23c are engaged with each other to prevent shifting in the radial direction, and the circularity of the stator can be improved. It is to be noted that, the contact portions 23c and 23d are not limited to the case where one has a convex shape in the peripheral direction and the other has a concave shape in the peripheral direction due to the surfaces having the structures as described above, and may be flat end surfaces. Further, the first surfaces 23c1 and 23d1 may extend in a direction perpendicular to the side surface 23e4 of the tooth.

Figure 4A:
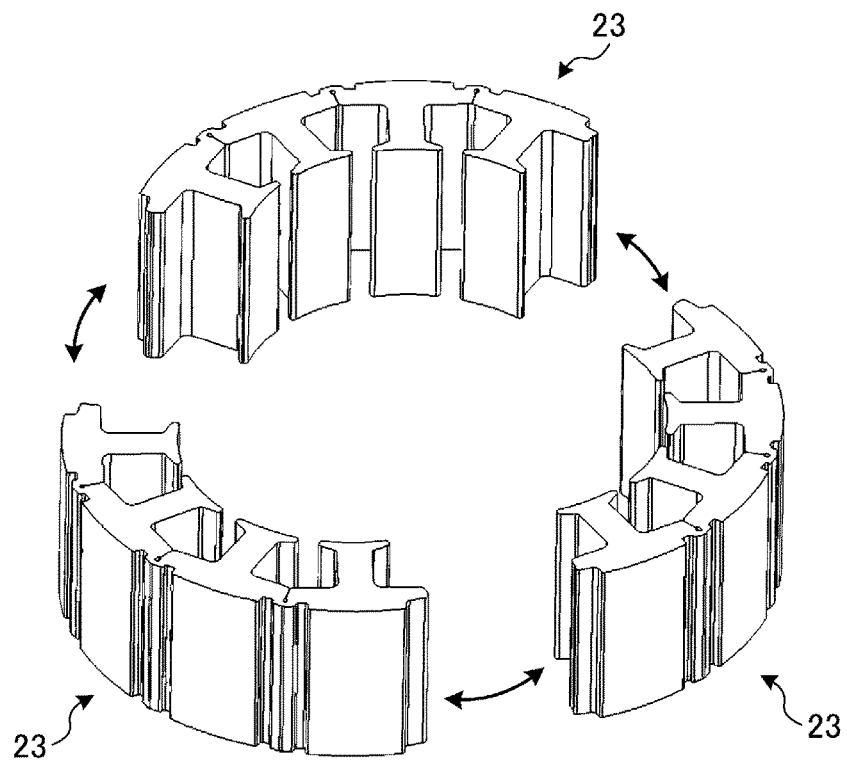
FIG. 4A is a diagram (1) showing an example in which a plurality of connection cores are formed in an annular shape.
Figure 4B:
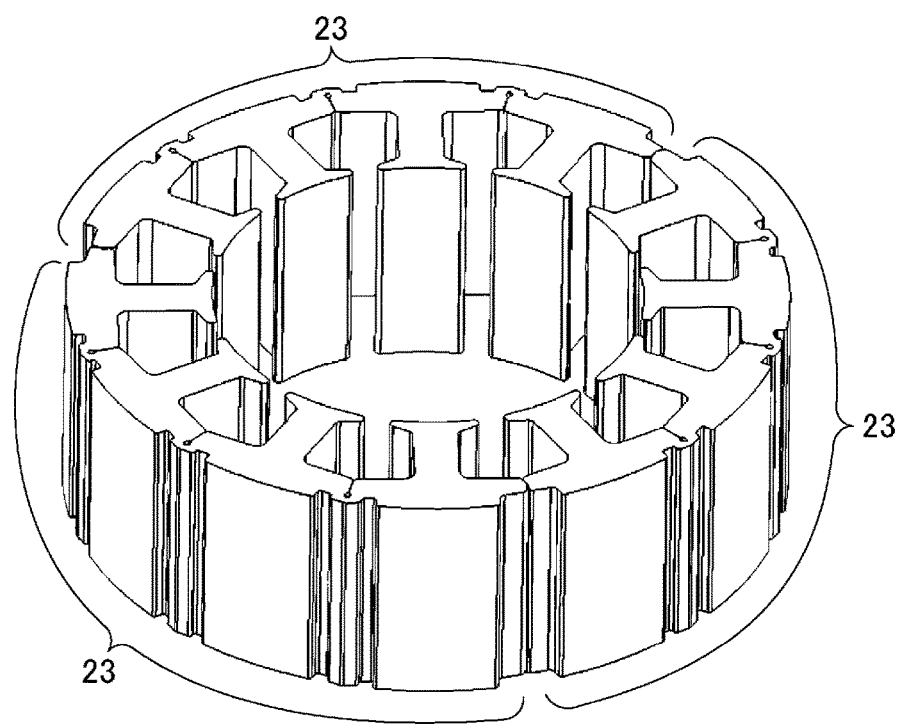
FIG. 4B is a diagram (2) showing an example in which a plurality of connection cores are formed in an annular shape.

FIG. 4A and FIG. 4B are diagrams showing an example in which a plurality of connection cores 23 are formed in an annular shape. It is to be noted that the formation of the annular core is conceptually shown, and in reality, as described above, the upper side insulator 24 and the lower side insulator 25 are mounted on each piece of the connection core 23 and the coil is wound and then the connection core 23 is bent. In FIG. 4A, three connection cores 23 are respectively bent into to a circular arc shape and then combined to form an annular core as shown in FIG. 4B.

In the conventional type of stator in which a continuous band-shaped core is bent in an annular shape, since bending in the annular shape is performed in one operation for a range of a 360° circle, an excessive force is applied to a part of the connection portions to deteriorate the circularity, and vibration due to the exciting force in the radial direction corresponding to the number of magnetic poles of the magnet were generated. On the other hand, in the present embodiment, after a plurality of (for example, three) connection cores 23 are bent in a circular arc shape, respectively, the plurality of connection cores 23 are combined, so that the circularity is improved. As a result, vibration and noise due to the exciting force in the radial direction corresponding to the number of magnetic poles of the magnet can be reduced.

Further, in a conventional type of stator in which a continuous band-shaped core is bent in an annular shape, since end portions are connected at one place in one circle, the rigidity is low with respected to the second-order and fourth-order annular vibration mode, and vibration and noise were generated from this point as well. On the other hand, in the present embodiment, the number of the segments is an odd number, for example, three, the connecting portions of the segments do not face each other through the center of the circle, and the rigidity with respect to the second-order and fourth-order annular vibration mode is high. As a result, reduction of vibration and noise can be expected.

Figure 5:
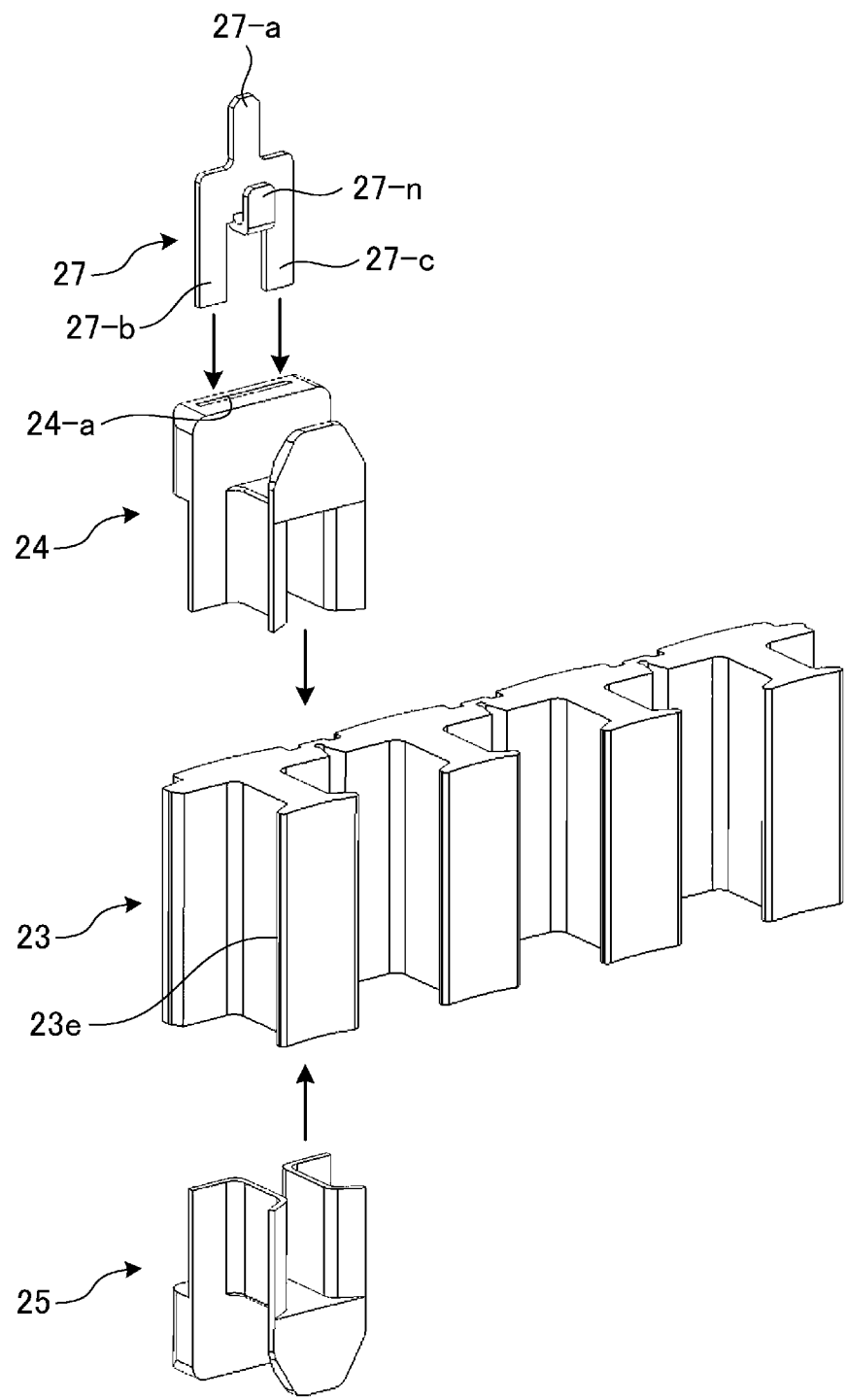
FIG. 5 is a diagram showing an example of application of an upper side insulator, a lower side insulator and a terminal to a connection core.

Next, FIG. 5 is a diagram showing an example of application of an upper side insulator 24, a lower side insulator 25 and a terminal 27 to a connection core 23. In FIG. 5, the upper side insulator 24 and the lower side insulator 25 are formed in a shape in which a vertically long (long in the direction in which the steel plates are stacked) coil bobbin can be vertically divided near the center, and the upper side insulator 24 and the lower side insulator 25 are mounted so as to accommodate the tooth 23e in a state where the connection core 23 is opened (a state where bending is not performed). Further, a hole portion 24-a for the terminal 27 is provided in the upper portion of the upper side insulator 24 (an end portion on the cover portion 12 side described later), and the terminal 27 is inserted. Specifically, the terminal 27 is provided with two projecting portions 27-b and 27-c extending toward the upper side insulator 24. These two projecting portions 27-b and 27-c are inserted in to the hole portion 24-a of the upper side insulator 24, and the terminal 27 is fixed to the upper side insulator 24. Further, the terminal 27 is provided with an end portion 27-a connected to the connecting plate 28 and a hook 27n connected to a lead wire.

Figure 6:
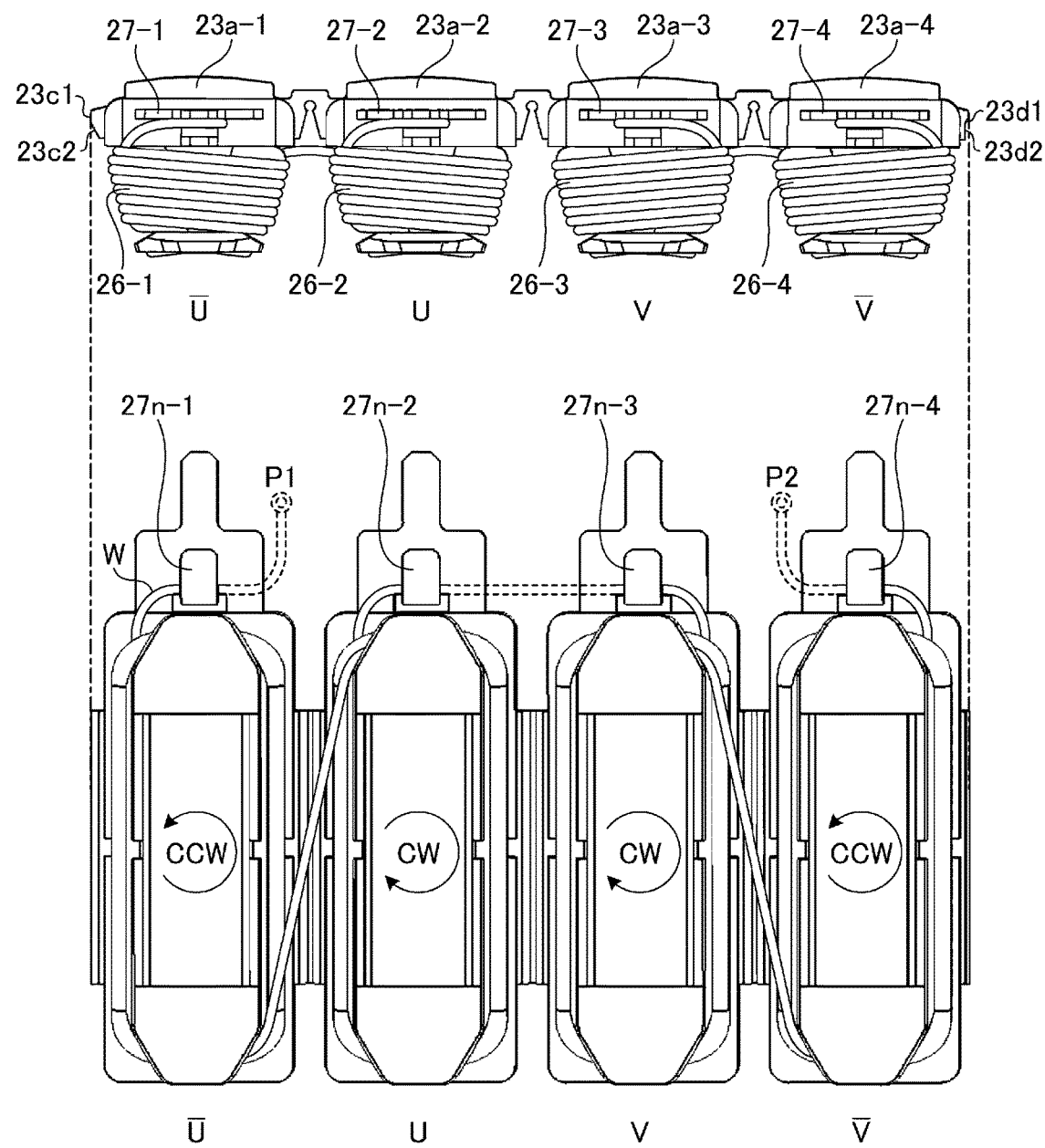
FIG. 6 is a diagram showing an example of winding of coils.

FIG. 6 is a diagram showing an example of winding of the coil 26 in the connection core 23, in which the upper section shows a plan view, and the lower section shows a front view. In FIG. 6, for example, a point P1 is taken as the winding start of the lead wire W, and after the lead wire W is passed through the hook 27n-1 of the terminal 27-1 of the piece 23a-1, the lead wire W is wound counterclockwise (CCW) to form a coil 26-1. Subsequently, the lead wire W is wound clockwise (CW) around the piece 23a-2 from the winding end of the coil 26-1 to form a coil 26-2, and the lead wire W is passed through the hook 27n-2 of the terminal 27-2 from the winding end of the coil 26-2. Subsequently, the lead wire W is passed through the hook 27n-3 of the terminal 27-3 of the piece 23a-3 and then wound clockwise (CW) to form a coil 26-3. Subsequently, the lead wire W is wound counterclockwise (CCW) around the piece 23a-4 continuously from the winding end of the coil 26-3 to form a coil 26-4, and the lead wire W reaches the winding end point P2 through the hook 27n-4 of the terminal 27-4. Then, after fixing the lead wire W (caulking, welding, etc.) at the hooks 27n-1 to 27n-4 of the terminals 27-1 to 27-4, the lead wire W between the point P1 and the hook 27n-1 of the terminal 27-1, between the hook 27n-2 of the terminal 27-2 and the hook 27n-3 of the terminal 27-3, and between the hook 27n-4 of the terminal 27-4 and the point P2 is cut.

It is to be noted that the winding start point P1 and the winding end point P2 may be reversed. Further, the clockwise (CW) winding and the counterclockwise (CCW) winding may be reversed, but it is necessary that the first coil 26-1 and the second coil 26-2 are in reverse directions, the second coil 26-2 and the third coil 26-3 are in the same direction, and the third coil 26-3 and the fourth coil 26-4 are in reverse directions, and the winding is performed like a so-called one-stroke writing. In other words, when the connection core 23 includes four pieces 23a-1 to 23a-4, in the peripheral direction, among the plurality of pieces, the winding direction of the coils 26-1 and 26-4 of two pieces 23a-1 and 23a-4 located at both ends is one direction, and the winding direction of the coils 26-2 and 26-3 of two pieces 23a-2 and 23a-3 between two pieces 23a-1 and 23a-4 located at both ends is an opposite direction to the one direction.

Figure 7:
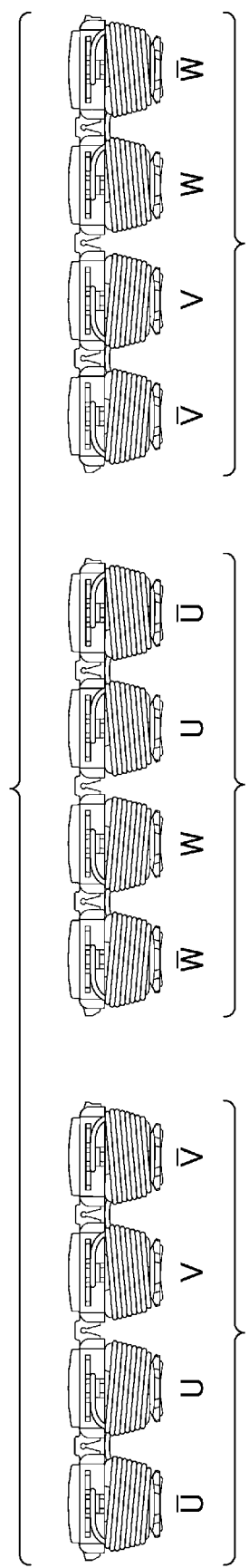
FIG. 7 is a diagram showing an example of phases assigned to each coil of three segments.

Further, in FIG. 6, the first coil 26-1 is of an inverted U-phase, the second coil 26-2 is of a U phase, the third coil 26-3 is of a V phase, and the fourth coil 26-4 is of an inverted V-phase, but the winding of the connection cores 23 constituting the respective segments is the same, and the other phases are applied in a same way. FIG. 7 is a diagram showing an example of the phases assigned to each coil of the three segments. The first segment is assigned an inverted U-phase, a U phase, a V-phase, and an inverted V-phase, the second segment is assigned an inverted W-phase, a W-phase, a U phase, and an inverted U-phase, and the third segment is assigned an inverted V-phase, a V-phase, a W-phase, and an inverted W-phase.

It is to be noted that, the surfaces 23c1 and 23d2 of the contact portions 23c and 23d of the two pieces on both sides of the connection core 23 are arranged in a direction perpendicular to the direction in which the plurality of pieces are lined up, and a coil may be wound around each of the pieces of the connection core 23. In a state where the pieces 23a are opened and the connection core 23 is linear, by providing the surfaces 23c1 and 23d2 to the contact portions 23c and 23d, the holding force with respect to the jig of the winding machine can be increased, and even if an external force (tension) continues to act on the connection core while winding the lead wire by the winding machine, the connection core 23 can be maintained in a linear state. Thereby, the coil can be wound around each piece of the connection core 23 with a predetermined tension, and the occupancy rate of the coil can be increased.

In the present embodiment, in the connection core 23, since the coil 26 is wound in a state where the pieces 23a are opened and the connection core 23 is linear as shown in FIG. 6, the lead wire W can be easily wound even when the space around the tooth is small like in a small motor. Further, since the coils 26 can be wound simultaneously for a plurality of connection cores 23, the productivity is greatly improved.

Figure 8:
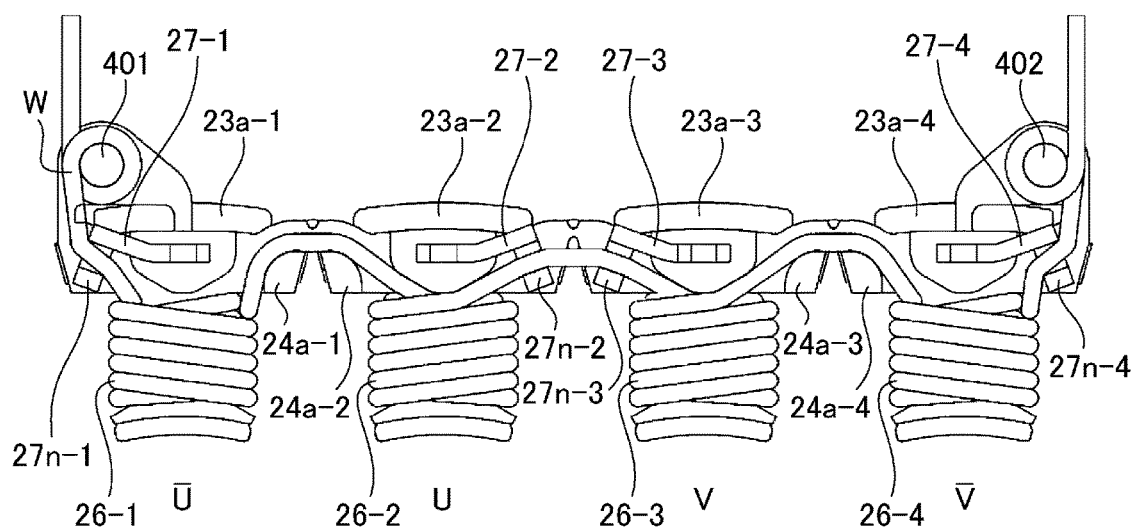
FIG. 8 is a diagram showing another example of winding of coils.

FIG. 8 is a diagram showing another example of winding of coils 26. In FIG. 8, the lead wire W is tangled around a first post (hereinafter, referred to as a winding start post) 401 provided on the jig, and the coil 26-1 of the piece 23a-1, the coil 26-2 of the piece 23a-2, the coil 26-3 of the piece 23a-3, and the coil 26-4 of the piece 23a-4 are sequentially wound to reach a second post (hereinafter, referred to as a winding end post) 402 provided on the jig.

In FIG. 8, further, the hook 27n-1 of the terminal 27-1 faces the winding start post 401 side, the hook 27n-2 of the terminal 27-2 and the hook 27n-3 of the terminal 27-3 face each other, and the hook 27n-4 of the terminal 27-4 faces the winding end post 402 side. In addition, in the direction in which the plurality of pieces are lined up, protrusions 24a-1 and 24a-2 are provided at the insulators at the upper surfaces of the portions where the piece 23a-1 and the piece 23a-2 face each other. Similarly, in the direction where the plurality of pieces are lined up, protrusions 24a-3 and 24a-4 are provided at the insulators at the upper surfaces of the portions where the piece 23a-3 and the piece 23a-4 face each other. With these configurations, the lead wire W can be arranged naturally, and the lead wire W is prevented from being loosened and protruded on the front end side of the piece, the rear end side of the piece (outer peripheral side of the stator 21), and the terminal side. It is to be noted that, after fixing the lead wire W at the hooks 27n-1 to 27n-4 of the terminals 27-1 to 27-4, the lead wire W between the winding start post 401 and the hook 27n-1 of the terminal 27-1, between the hook 27n-2 of the terminal 27-2 and the hook 27n-3 of the terminal 27-3, and between the hook 27n-4 of the terminal 27-4 and the winding end post 402 is cut. It is to be noted that the relationship between the winding start and the winding end, and the winding direction are the same as those shown in FIG. 6.

Figure 9A:
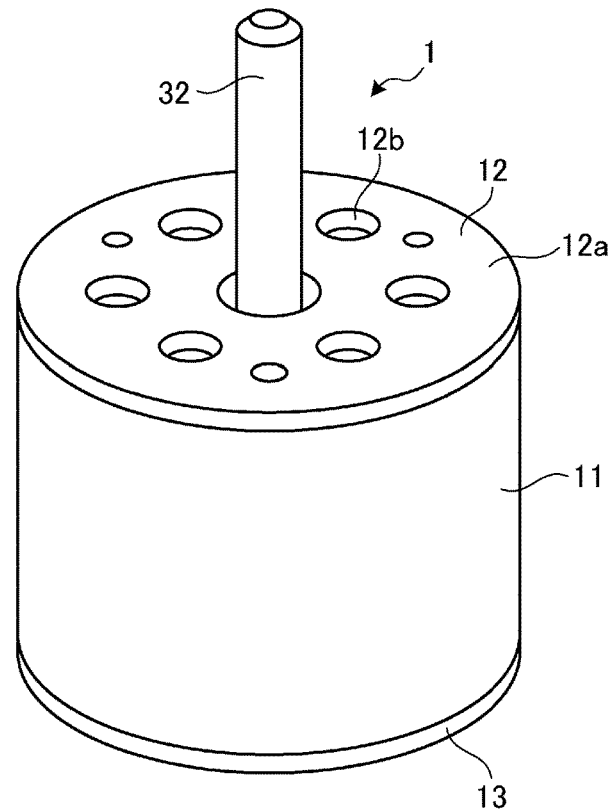
FIG. 9A is a perspective view (1) showing a configuration example of the motor.
Figure 9B:
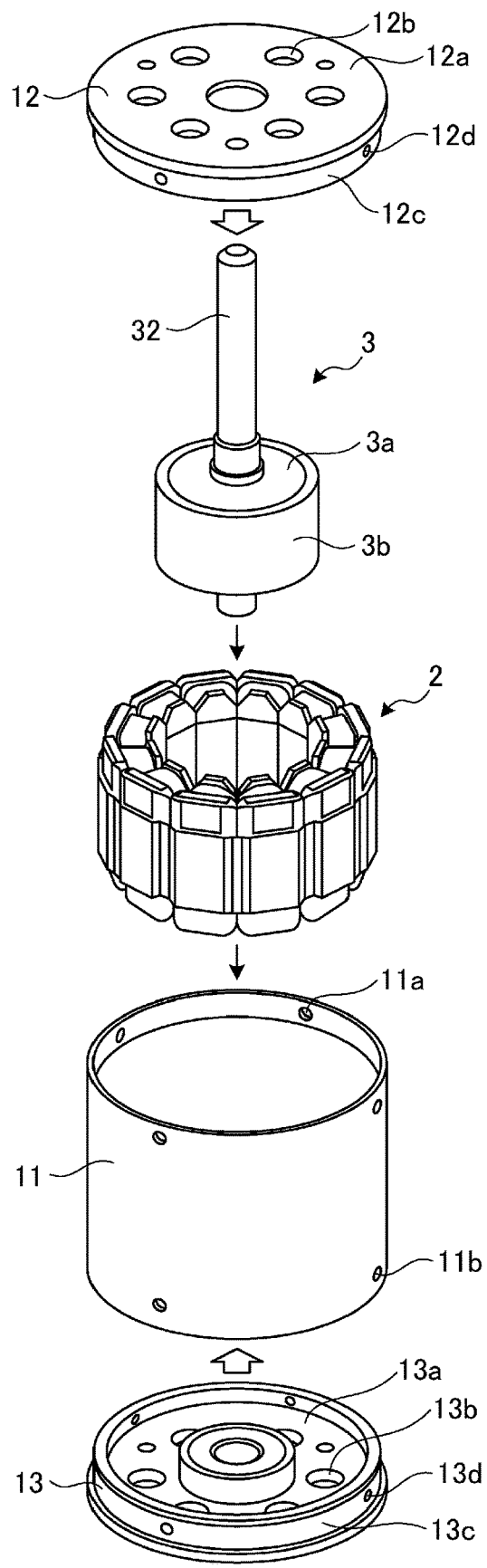
FIG. 9B is a perspective view (2) showing a configuration example of the motor.

FIG. 9A and FIG. 9B are perspective views showing an example of a configuration of a motor 1 to which the stator 2 described above is applied. FIG. 9A shows an external appearance, and FIG. 9B shows the main components. In FIG. 9A, the motor 1 includes a tubular portion 11, cover portions 12 and 13, and a shaft 32. The tubular portion 11, the cover portions 12 and 13 form a housing. In FIG. 9B, the stator 2 is inserted (press-fitted) into the tubular portion 11 in a tubular shape, a rotor 3 is arranged in the space inside the stator 2, and a shaft 32 of the rotor 3 is rotatably supported by the upper and lower cover portions 12 and 13 that hold the bearing. In the longitudinal direction of the rotor 3, a plurality of hole portions 12b are provided in the surface 12a of the cover portion 12 facing the stator 2, and a plurality of hole portions 12d are provided in the outer peripheral portion 12c of the cover portion 12. Similarly, in the longitudinal direction of the rotor 3, a plurality of hole portions 13b are provided in the surface 13a of the cover portion 13 facing the stator 2, and a plurality of hole portions 13d are provided in the outer peripheral portion 13c of the cover portion 13. Members such as screws may be inserted and fixed in the hole portions 12d and 13d provided in the outer peripheral portions 12c and 13c of the cover portions 12 and 13, and the hole portions 11a and 11b provided in the outer peripheral portion of the tubular portion 11. Regarding the rotor 3, in the illustrated example, the shaft 32 is provided with a rotor yoke 3a as a magnetic body, and an annular magnet 3b is provided at the outer peripheral surface of the rotor yoke 3a.

It is to be noted that, the rotor 3 includes a rotor yoke 3a formed in an annular shape by laminating electromagnetic steel sheets as magnetic members, and a shaft 32 provided as to penetrate the rotor yoke 3a may be provided at the center of the rotor yoke 3a. For example, the rotor yoke 3a is formed in an annular shape by bending four substantially fan-shaped pieces connected by connection portions so as to sandwich the rod-shaped shaft 32, and the connecting portions of the end portions of the connection cores are connected by laser welding or the like along the axial direction. Further, the rotor yoke 3a is provided with a hole portion for generating reluctance torque, and a magnet is provided in the hole portion as necessary. It is to be noted that, the terminals 27 and the connecting plate 28 of the stator 2 are not shown.

Second Embodiment

Figure 10:
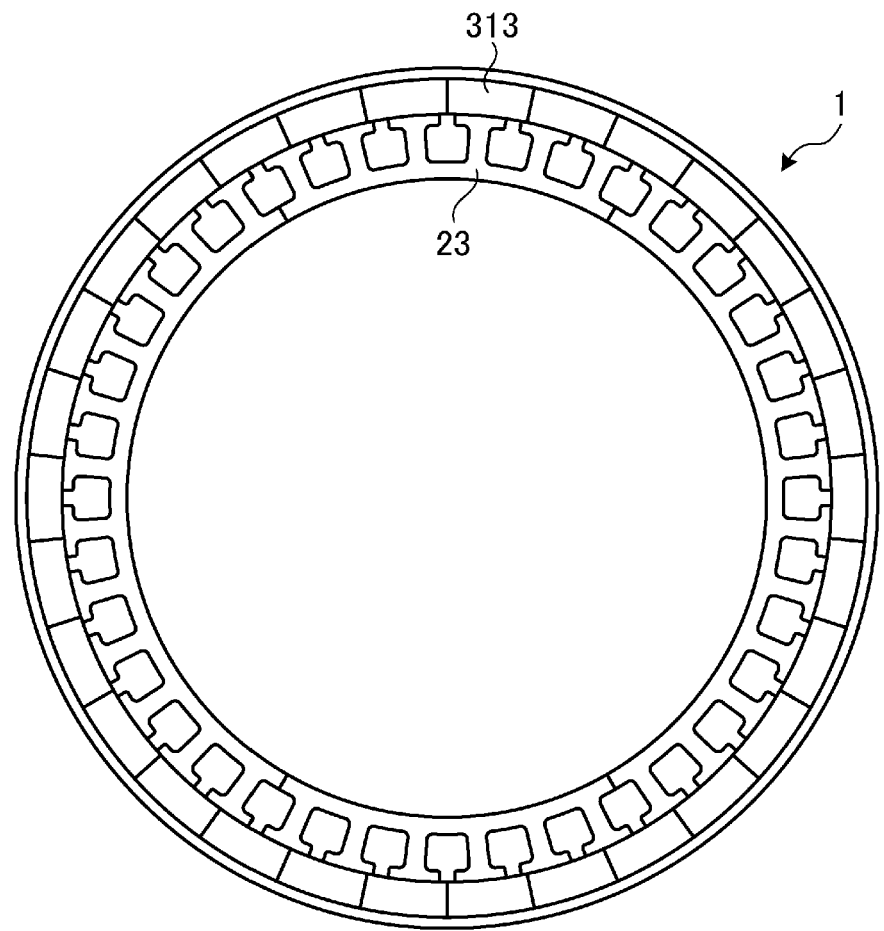
FIG. 10 is a diagram (1) showing a configuration example of a connection core according to a second embodiment.
Figure 11:
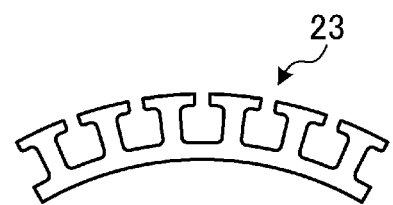
FIG. 11 is a diagram (2) showing a configuration example of the connection core according to the second embodiment.

FIG. 10 and FIG. 11 are diagrams showing an example of a configuration of a connection core 23 according to the second embodiment, and show an example of the connection core 23 applied to an outer rotor type motor 1. In FIG. 10, six (six segments) connection cores 23 are coupled in an annular shape to form a stator 2. FIG. 11 shows one connection core 23, in which six pieces are provided and bent in a circular arc shape. It is to be noted that, although the thickness of the connection portion between the pieces is uniform, it may be a thin connection portion as shown in FIG. 3A.

Third Embodiment

In the connection core 23 having the configuration as described in FIG. 3A, when the connection core 23 is bent in an annular shape, a magnetic path is formed by the connection portion 23b being a part of the steel plate and a portion (contact portion) where the two contact portions 23b-c are in contact. While the connection portion 23b has a large magnetic permeability, voids microscopically occur at the contact portion so that the magnetic permeability is equivalent to that of air, and the difference in the magnetic resistance of the contact portion with respect to the connection portion 23b is large. Therefore, the magnetic flux is concentrated on the connection portion 23b to cause magnetic saturation, which may cause adverse effects such as generation of unnecessary heat. In the present embodiment, by using a grain-oriented electrical steel sheet in the manufacture of the connection core 23, the difference in the magnetic resistance between the connection portion 23b and the contact portion is reduced, the magnetic saturation is less likely to occur, and the occurrence of unnecessary heat or the like is prevented.

Figure 12:
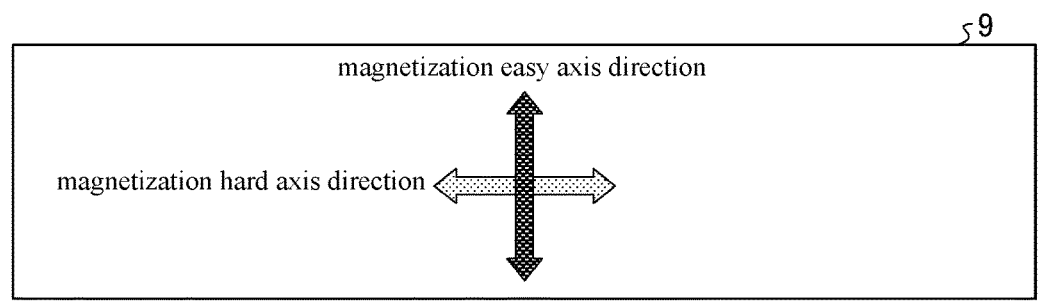
FIG. 12 is a diagram showing an example of a grain-oriented electrical steel sheet according to a third embodiment.

FIG. 12 is a diagram showing an example of a grain-oriented electrical steel sheet 9 according to the third embodiment. The grain-oriented electrical steel sheet is an electromagnetic steel plate in which magnetic characteristics are biased so as to be magnetized in a specific direction by aligning the directions of crystal axes when the steel plate is rolled, and generally the magnetization easy axis direction and the magnetization hard axis direction in the left-right direction are orthogonal to each other. In FIG. 12, the up-down direction in the figure is the magnetization easy axis direction, and the left-right direction in the figure is the magnetization hard direction.

Figure 13:
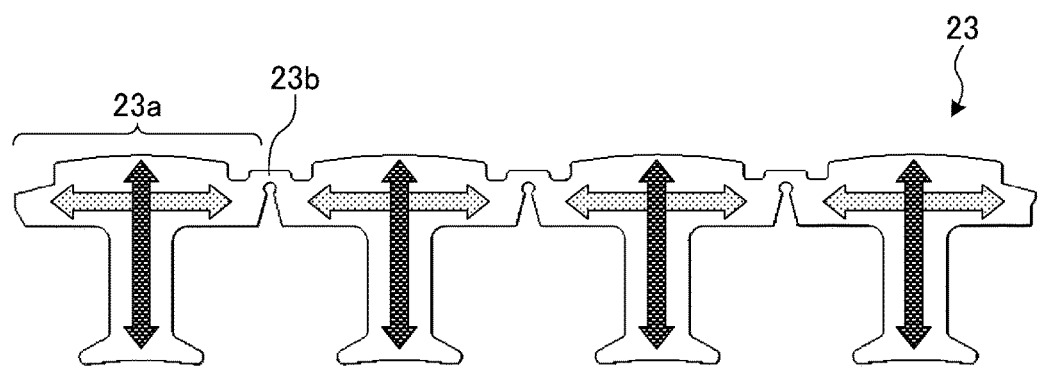
FIG. 13 is a diagram showing an example of a connection core according to the third embodiment.

FIG. 13 is a diagram showing an example of the connection core 23 according to the third embodiment, and is an example of the connection core 23 formed by stacking steel plates which are formed by punching the grain-oriented electrical steel sheet 9 of FIG. 12. That is, the connection core 23 is formed of grain-oriented electrical steel sheets, and the magnetization hard axis direction of the grain-oriented electrical steel sheet is a direction from one connection portion toward the other connection portion among the plurality of connection portions of the connection core 23. Therefore, the direction in which the magnetic flux flows through the connection portion 23b (the left-right direction in the figure) becomes the magnetization hard axis direction.

In the grain-oriented electrical steel sheet, there is a difference of 100 times or more between the magnetic permeability in the magnetization easy axis direction and the magnetic permeability in the magnetization hard axis direction, for example. The magnetic permeability in the magnetization easy axis direction is, for example, 10000 to 100000, but the magnetic permeability in the magnetization hard axis direction is, for example, only about 100 to 1000. Therefore, when the magnetization hard axis direction is set to the direction in which the magnetic flux flows in the connection portion 23b, the magnetic permeability of the contact portion is 1, which is the same as the magnetic permeability of the air. Assuming that the magnetic permeability of the connection portion 23b is set to, for example, "100" and the cross-sectional area of the magnetic path of the connection portion 23b is 1/10 of the cross-sectional area of the contact portion, the difference in the magnetic resistance is smaller than that in the case where the magnetization easy axis is set in the direction in which the magnetic flux flows in the connection portion 23b. As a result, the magnetic flux is less likely to flow not only in the connection portion 23b but also in the contact portion, magnetic saturation can be suppressed in the connection portion 23b, magnetic loss is reduced, and unnecessary heat generation is suppressed.

Fourth Embodiment

In FIG. 9A and FIG. 9B, the arrangement of the stator 2 in the motor 1 has been described. When the stator 2, in which the three connection cores 23 have been arranged in an annular shape, can be assembled in a manner of being press-fitted into the housing, a highly accurate stator 2 can be manufactured in a short time. Thus, the three connection cores 23 can be easily assembled by being press-fitted into the housing while maintaining the state of being arranged in an annular shape. Therefore, in the fourth embodiment, a method of press-fitting the stator 2 using a jig will be described.

Figure 14A:
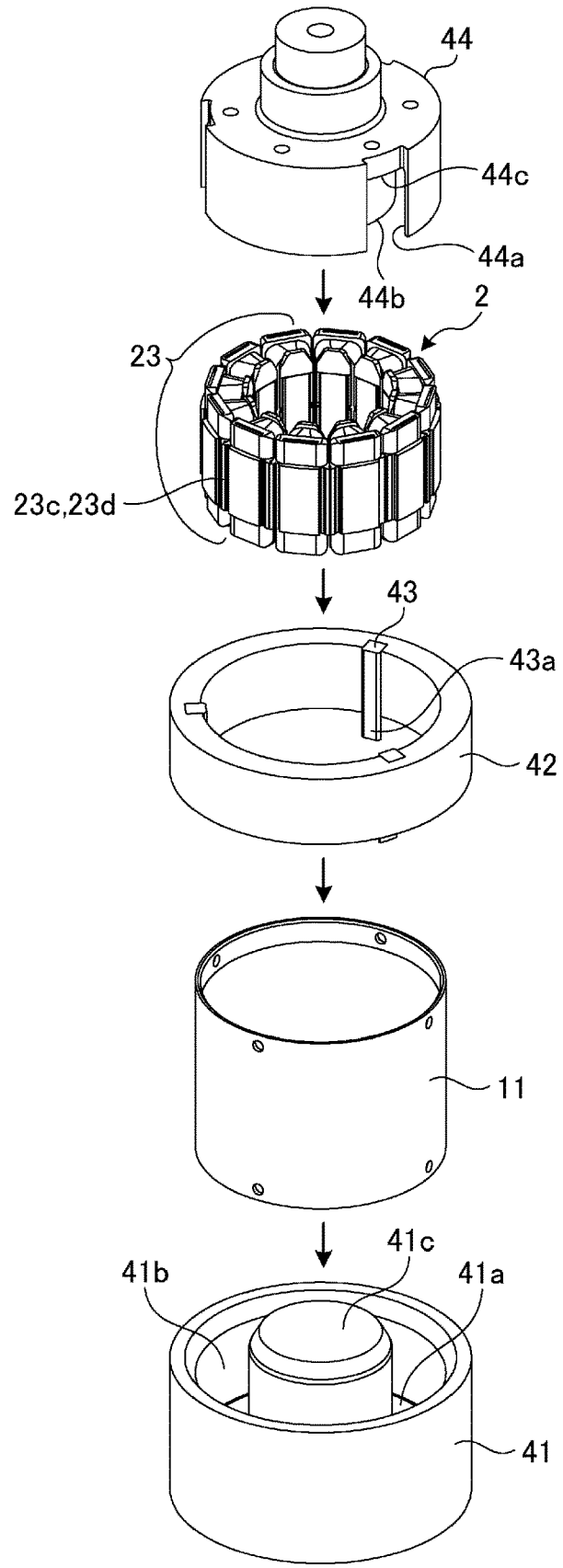
FIG. 14A is a diagram (1) showing an example of press-fitting of a stator according to a fourth embodiment.
Figure 14B:
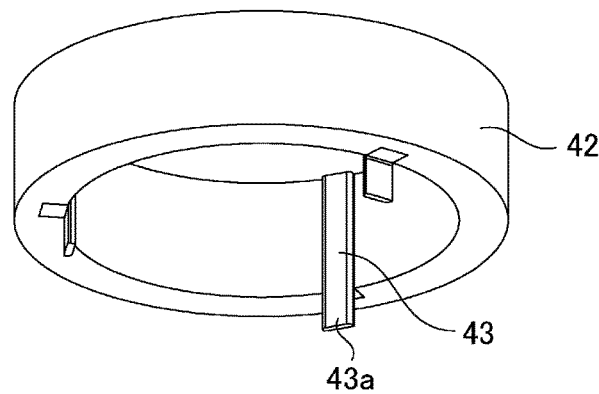
FIG. 14B is a diagram (2) showing an example of press-fitting of the stator according to the fourth embodiment.
Figure 14C:
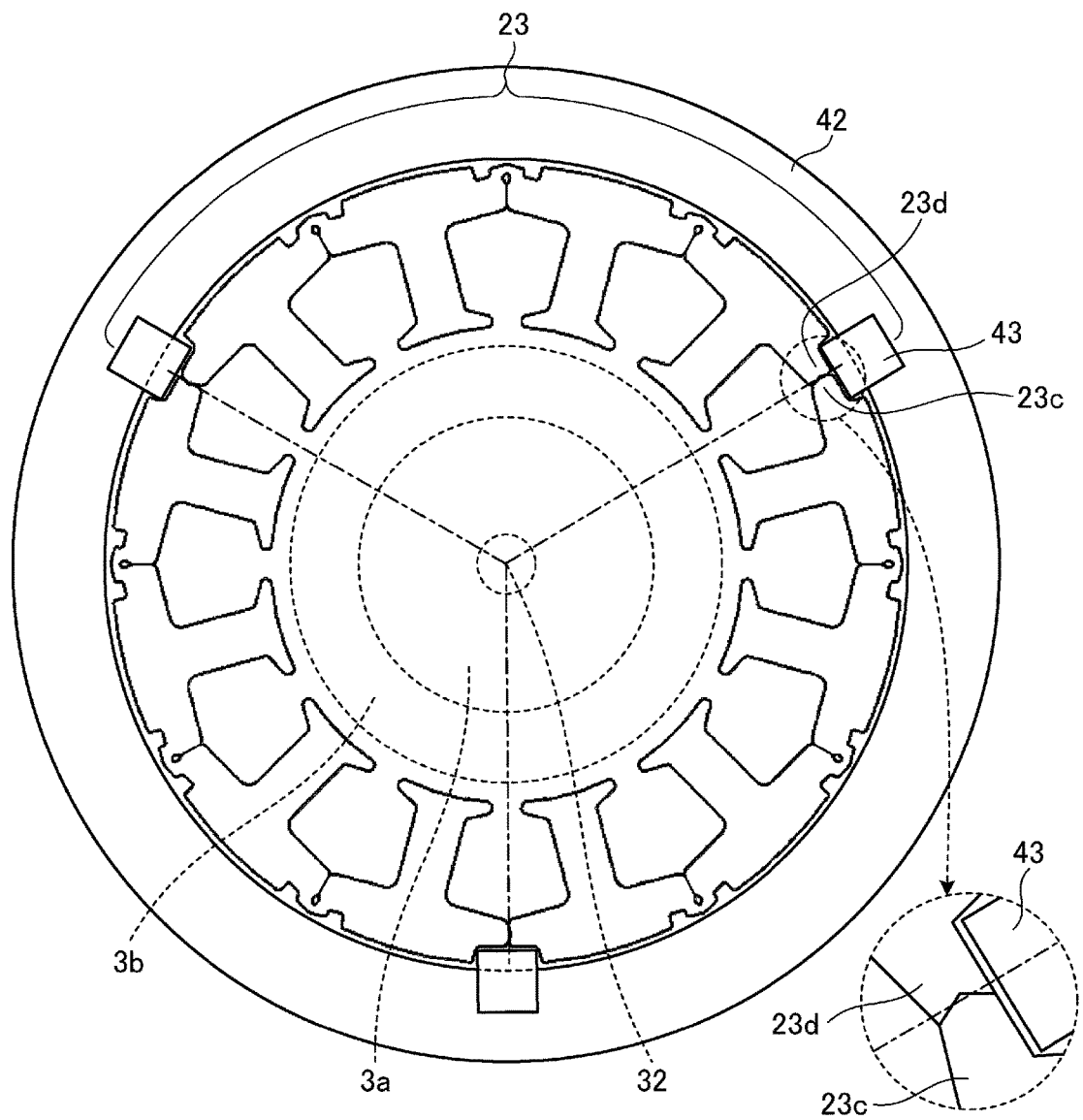
FIG. 14C is a diagram (3) showing an example of press-fitting of the stator according to the fourth embodiment.

FIG. 14A to FIG. 14C are diagrams showing an example of press-fitting the stator 2 according to the fourth embodiment. First, in FIG. 14A, the tubular portion 11 of the housing is fitted in the lower side jig 41. The lower side jig 41 has a bottom portion 41a, an inner surface in close contact with the outer peripheral surface of the tubular portion 11, and a convex portion 41c fitted into a hollow portion 41b (corresponding to the space of the rotor 3) in the center of the stator 2.

On the other hand, the stator 2 including, for example, three connection cores 23, in which the coils are wound and bent in a circular arc shape, is inserted into the stator holding jig 42. The stator holding jig 42 has a contact portion 43 with a predetermined width protruding toward the center side by a predetermined distance at a position corresponding to the contact portions of the three connection cores 23. Further, as shown in FIG. 14B, at the lower end portion of the stator holding jig 42, an end portion (hereinafter, referred to as a guide piece) 43a extends downward from the contact portion 43, and the guide piece 43a of the contact portion 43 is inserted into the inner periphery of the tubular portion 11. FIG. 14C shows a state where the three connection cores 23 have been inserted into the stator holding jig 42. The contact portions 23d and 23c of connection core 23 are pressed in the central direction by the contact portion 43 of the stator holding jig 42 to maintain the annular shape. At this time, as shown in an enlarged manner, two engaging surfaces of the contact portions 23c and 23d of the adjacent connection cores 23 are surfaces intersecting a surface extending from the contact portions 23c and 23d in the radial direction and passing through the center of the shaft 32 which is the center of the rotor yoke 3a and magnet 3b. Therefore, the contact portions 23c are engaged with each other to prevent deviation in the radial direction, and the circularity of the stator can be improved.

Returning to FIG. 14A, the stator holding jig 42 into which the stator 2 is inserted is arranged on the tubular portion 11, and the upper side jig 44 is pressed from the upper portion of the stator 2 when the guide piece 43a on the lower end side of the contact portion 43 is inserted into the inner surface of the tubular portion 11. The upper side jig 44 has an inner surface 44a in close contact with the outer peripheral surface of the stator 2, a convex portion 44b fitted into a hollow portion (corresponding to the space of the rotor 3) inside the stator 2, and a ceiling portion 44c that comes into contact with the upper surface of the stator 2. Then, the stator 2 is press-fitted into the tubular portion 11 while maintaining a high circularity by being pressed downward by the upper side jig 44 in a state where the contact portions 23c and 23d of each connection core 23 of the stator 2 are held by the contact portion 43 of the stator holding jig 42. In this way, a highly accurate stator 2 can be manufactured in a short time.

Fifth Embodiment

In the process of winding the coils 26 (coils 26-1 to 26-4) as shown in FIG. 6 with respect to the connection core 23 shown in FIG. 3A, FIG. 3B and the like, it is difficult to firmly fix the connection core 23 with a jig for each linear connection core 23 before being made into an annular shape. However, the linear connection core 23 is often required to wind a lead wire having a large wire diameter by taking advantage of its wide open slot, and a very high tension is applied to the lead wire when winding a lead wire with a large wire diameter, which makes it more difficult to fix the connection core 23. Therefore, the fifth embodiment presents a modified example in which the connection core 23 can be firmly fixed.

Figure 15:
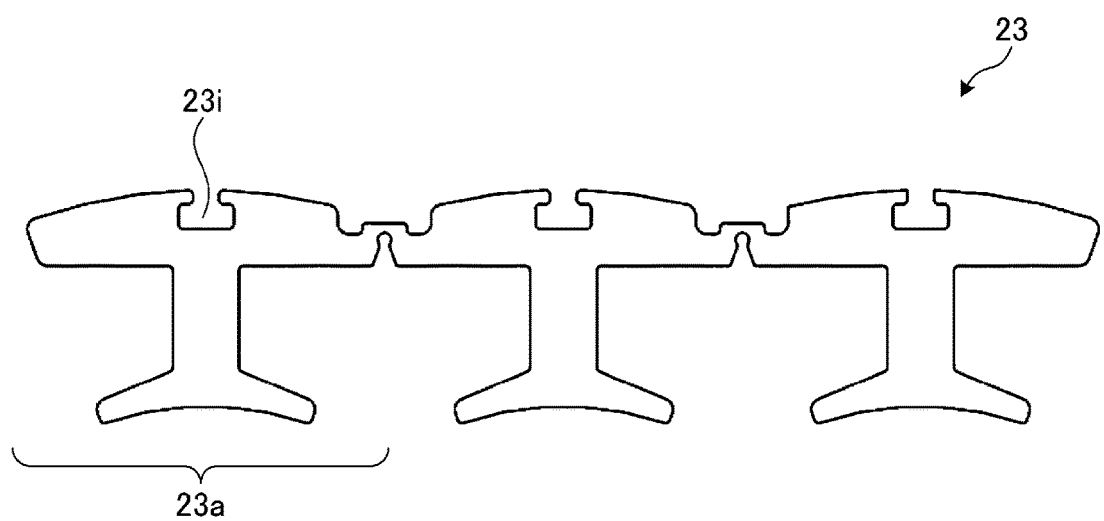
FIG. 15 is a plan view showing an example of the shape of a connection core according to a fifth embodiment.

FIG. 15 is a plan view showing an example of the shape of a connection core 23 according to the fifth embodiment. In FIG. 15, a groove 23i along a direction (the stacking direction of the steel plates when the connection core 23 is formed by stacking steel plates) perpendicular to the paper surface of the figure is provided at the magnetic pole back portion (a portion that becomes the outer peripheral side when the connection core 23 is bent in a circular arc shape) of each of the pieces 23a constituting the connection core 23. When the groove 23i is formed by stacking of steel plates, the groove 23i is formed by providing a notch corresponding to the groove 23i in the steel plate and by stacking the steel plates. The groove 23i has a substantially rectangular opening shape inside, and is connected to a narrow opening on the magnetic pole back portion side. It is to be noted that, although the illustrated connection core 23 is configured by three pieces 23a, it may be configured by four or other number of pieces 23a as shown in FIG. 3A or the like. Further, the contact portions 23c and 23d having the shapes shown in FIG. 3A or the like may be provided at both end portions of the connection core 23.

Regarding the connection core 23 having the configuration shown in FIG. 15, in the process of winding the coil, a part of the jig bites into the groove 23i of the connection core 23, so that the connection core 23 is firmly fixed, and even when a very high tension is applied to the lead wire during winding the lead wire having a large wire diameter, stable fixing is performed and the reliability of winding is increased.

Sixth Embodiment

In the connection core 23 having the configuration as described with reference to FIG. 3A, since each of the connection cores 23 is divided into a plurality of pieces 23a, and an annular stator 2 is configured from the plurality of connection cores 23, it was sometimes difficult to maintain good circularity when assembling in an annular shape. Further, since the assembly is performed in a state where each of the plurality of connection cores 23 is divided, the connection portion 23b is easily affected by the stress due to vibration, and the connection portion 23b may be unintentionally deformed. Therefore, in the sixth embodiment, a method for improving such a point is presented.

Figure 16A:
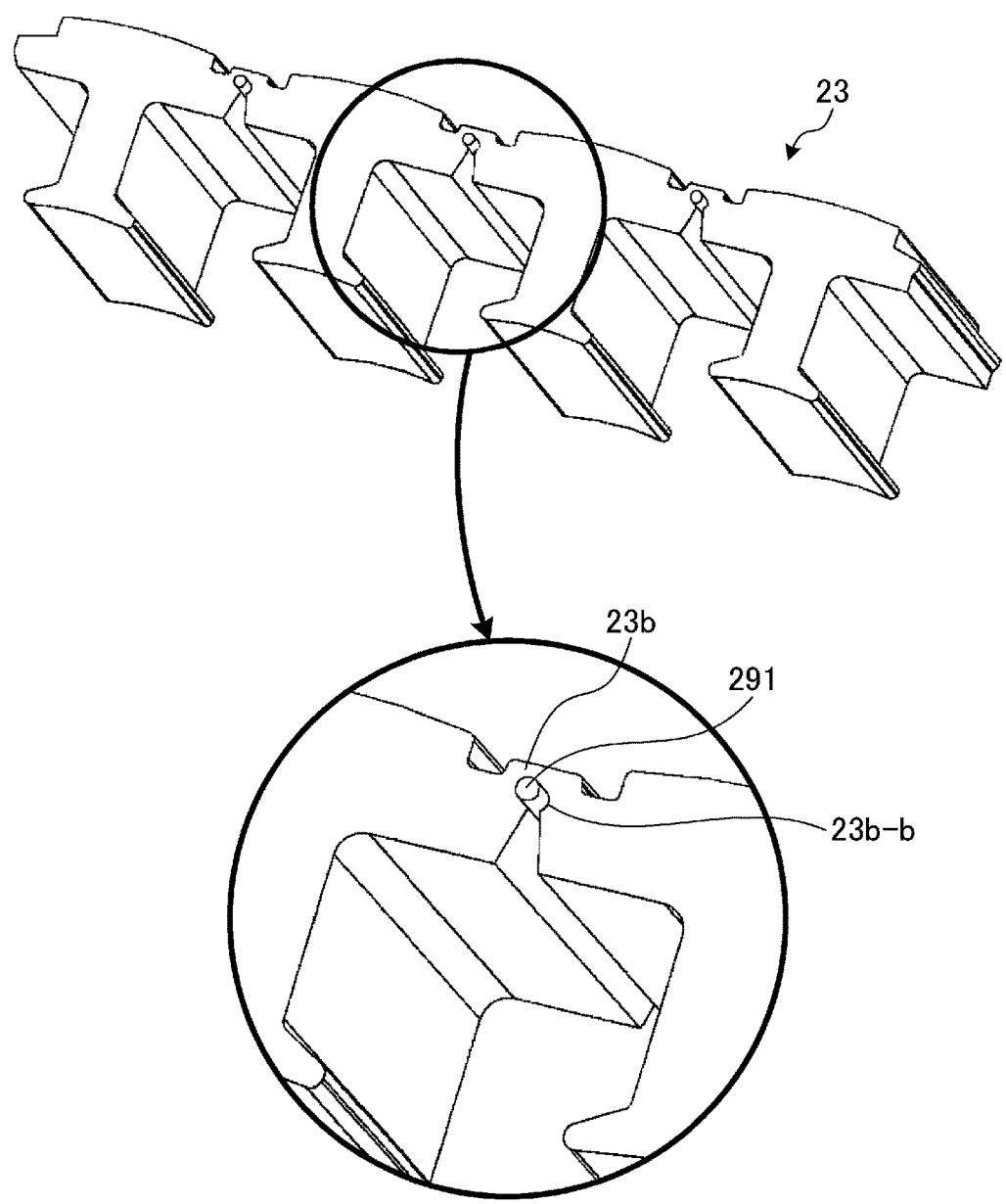
FIG. 16A is a diagram (1) showing an example of insertion of an elastic member according to a sixth embodiment.
Figure 16B:
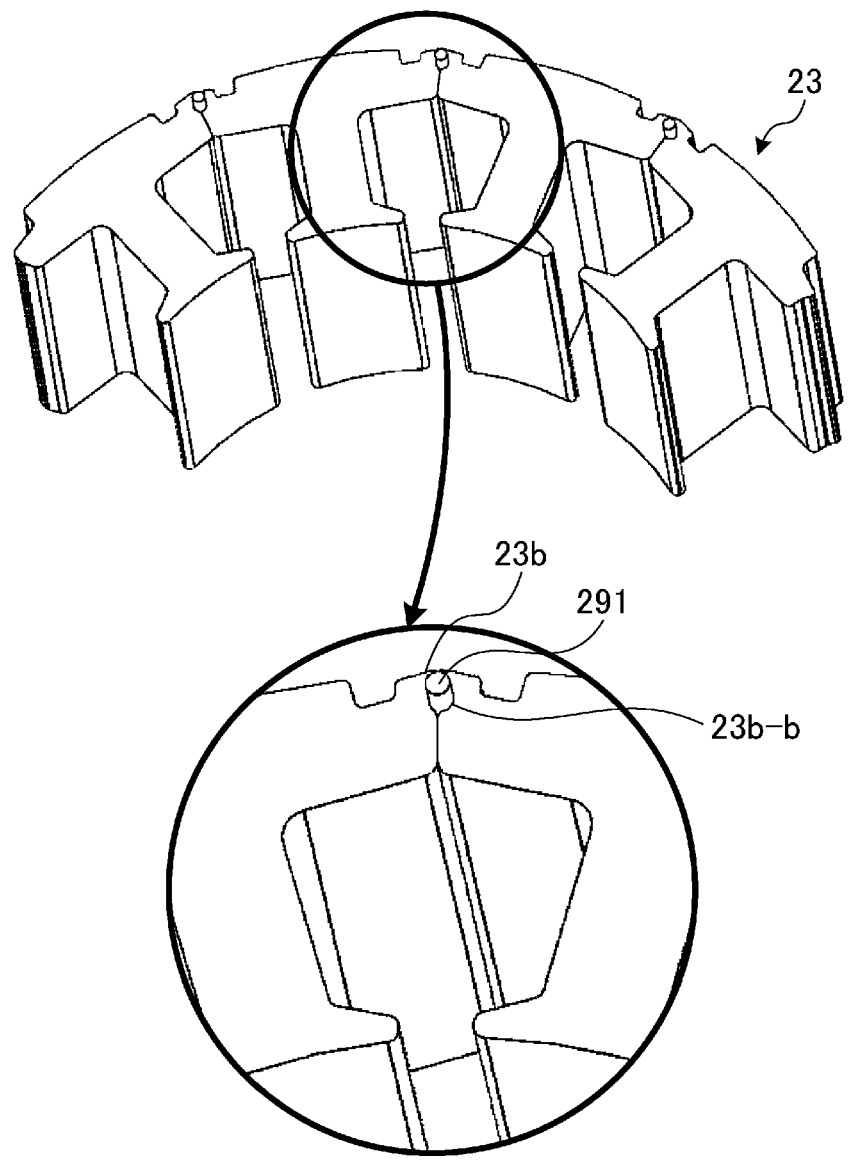
FIG. 16B is a diagram (2) showing an example of insertion of the elastic member according to the sixth embodiment.

FIG. 16A and FIG. 16B are diagrams showing an example of insertion of an elastic member 291 according to the sixth embodiment. FIG. 16A shows a state before the connection portion 23b of the connection core 23 is bent, and FIG. 16B shows a state after the connection portion 23b is bent.

First, in FIG. 16A, each connection portion 23b of the connection core 23 is provided with a curved recess portion 23b-b. This recess portion 23b-b is provided on the side of the connection portion 23b where the connection portion 23b is bent to narrow the space on the inner side of the connection portion 23b. An elastic member 291 such as a rod-shaped rubber is inserted into this curved recess portion 23b-b. It is to be noted that, the size of the outer shape of the elastic member 291 (hereinafter, referred to as the diameter) is set to be larger than the size of a gap formed when the recess portion 23b-b is bent (hereinafter, referred to as the inner diameter). Therefore, the elastic member 291 generates a repulsive force in the direction from the inner side to the outer side with respect toward the inner surface of the recess portion 23b-b. Further, the timing of inserting the elastic member 291 is preferably after winding the coil to the connection core 23 from the viewpoint of preventing the elastic member 291 from falling off. It is to be noted that, the elastic member 291 may be inserted into all the recess portions 23b-b, or may be inserted at a rate of one per several recess portions 23b-b within a range in which the symmetry of the stator 2 can be maintained.

FIG. 16B shows a state after the connection portion 23b of the connection core 23 is bent and the connection core 23 is formed in a circular arc shape. The diameter of the elastic member 291 is set to be larger than the inner diameter of the curved recess portion 23b-b of the connection portion 23b when it is bent, and the repulsive force acts from the inner side due to the compression of the elastic member 291, so that the connection portion 23b is in a state of not being completely bent. In this state, for example, in a state where the three connection cores 23 are combined and temporarily assembled in an annular shape, press-fitting into the housing (tubular portion 11) is performed. The press-fitting may be performed without using a special jig, or may be performed by a jig as described with reference to FIG. 14A and FIG. 14B.

When the plurality of connection cores 23 (hereinafter, may be referred to as a temporarily assembled stator) in a state of being temporarily assembled in an annular shape are press-fitted into the housing, due to the contact between the temporarily assembled stator and the inner surface of the housing, an inward force acts on the temporarily assembled stator, but the repulsive force by the elastic member 291 offsets the force received from the inner surface of the housing. The outer peripheral surface of the temporarily assembled stator in the offset state approaches the circularity of the inner surface of the housing. Therefore, a good circularity can be maintained by fixing the temporarily assembled stator with an adhesive or the like in this offset state.

In this way, since a force that presses the connection core 23 itself against the housing is generated by the elastic member 291, it is easy to obtain a circularity consistent with the circularity of the inner surface of the housing. Further, since the vibration is damped by the elastic member 291, unintended deformation of the connection portion 23b is prevented, and the generation of noise is suppressed by the damping of the vibration.

Seventh Embodiment

In the seventh embodiment, a method for maintaining a good circularity when a plurality of connection cores 23 are assembled in an annular shape is presented by a method different from the embodiments described above.

Figure 17A:
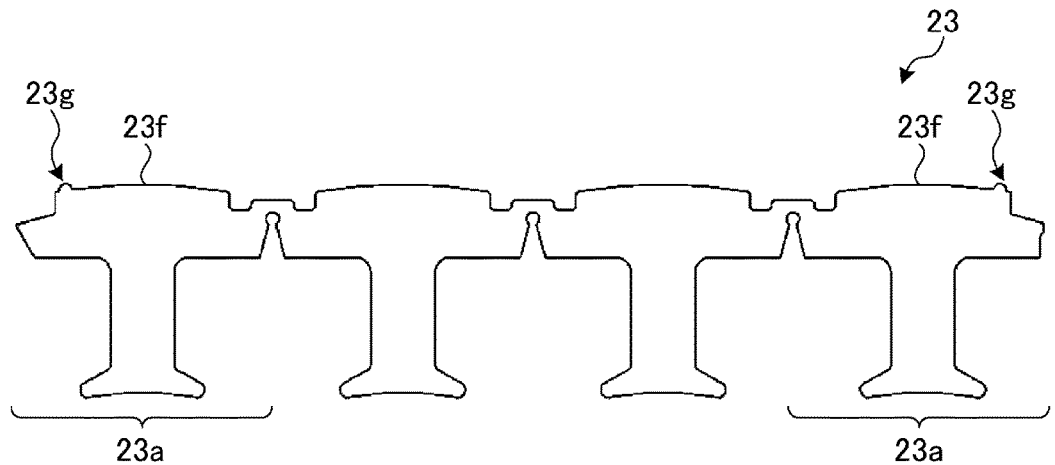
FIG. 17A is a diagram (1) showing an example of a protruding portion according to a seventh embodiment.
Figure 17B:
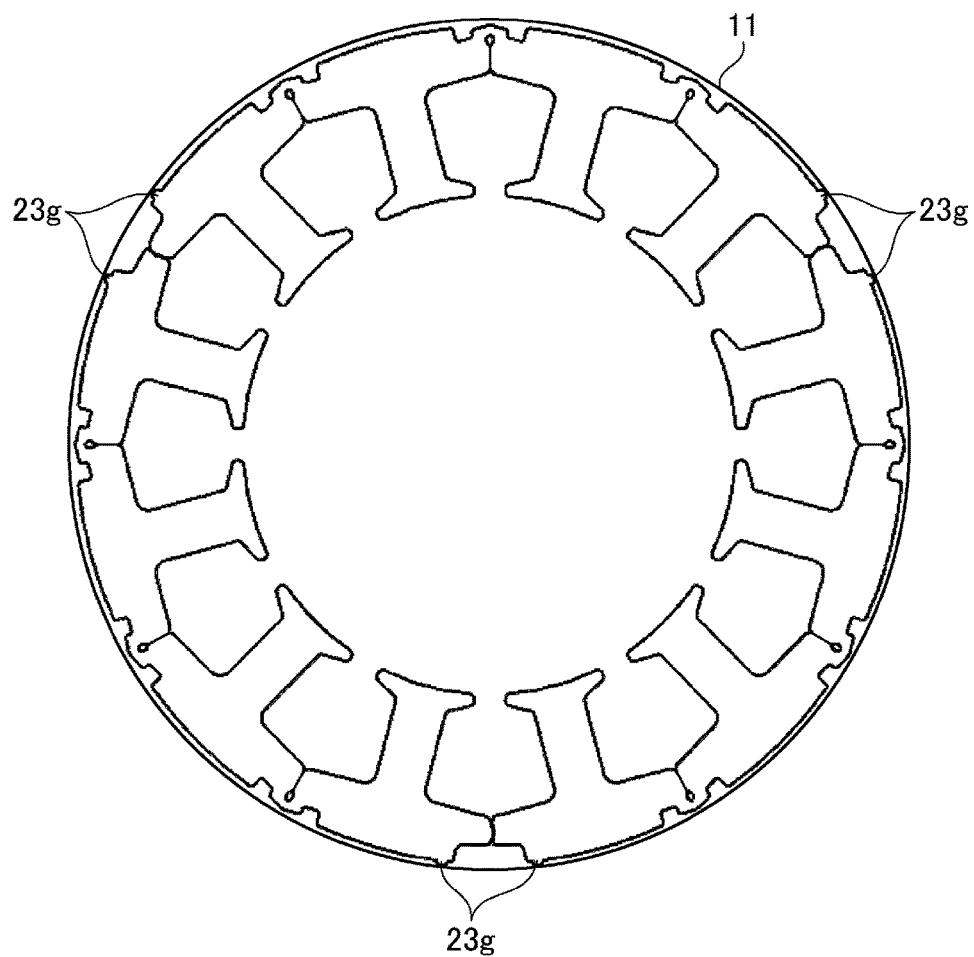
FIG. 17B is a diagram (2) showing an example of the protruding portion according to the seventh embodiment.
Figure 17C:
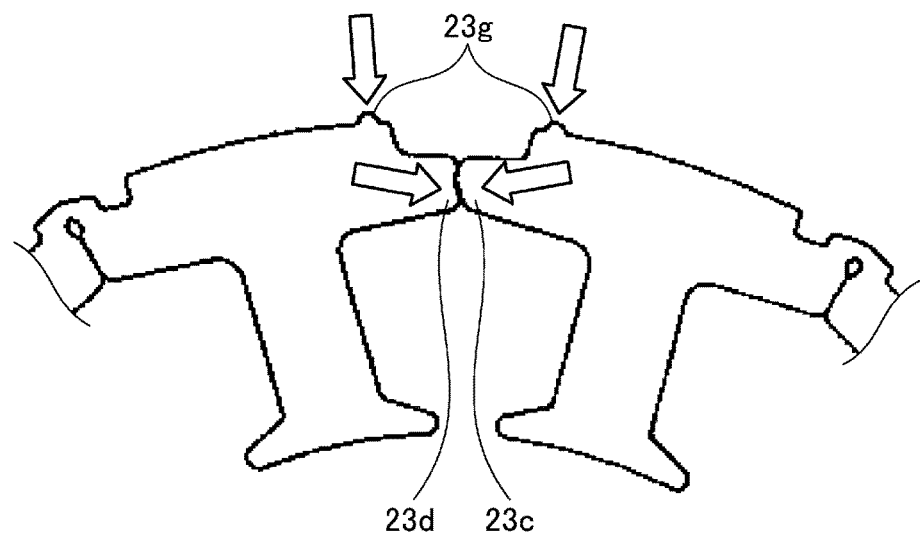
FIG. 17C is a diagram (3) showing an example of the protruding portion according to the seventh embodiment.

FIG. 17A to FIG. 17C are diagrams showing an example of a protruding portion 23g according to the seventh embodiment. FIG. 17A shows a band-shaped connection core 23, before the plurality of connection cores 23 are bent. Protruding portions 23g are provided at the pieces 23a serving as the left and right end portions of the band-shaped connection core 23. The protruding portion 23g is provided at a curved portion forming the outer peripheral portion of the piece 23a. The curved portion of the piece 23a is a circular arc portion 23f in the illustrated example, and a protruding portion 23g is provided at one end portion of the circular arc portion 23f. The protruding portion 23g is located on the outermost side of the plurality of connection cores 23 when the plurality of connection cores 23 are bent in an annular shape, and forms the outermost peripheral portion of the plurality of connection cores 23 bent in an annular shape. Therefore, at least the protruding portion 23g and a part of the plurality of connection cores 23 are in contact with the inner surface of the tubular portion 11 of the housing.

FIG. 17B shows a state where the three connection cores 23 are press-fitted into the tubular portion 11. The protruding portion 23g is in contact with the inner surface of the tubular portion 11. If there is no protruding portion 23g, when a plurality of (for example, three) connection cores 23 are temporarily assembled and then press-fitted into the housing, the whole peripheral surface of the connection core, or due to dimensional tolerances, only a few unexpected places on the outer periphery of the connection core 23 receive reaction force by the press-fitting, and in the temporarily assembled stator 2, the contact portions 23c and 23d of the end portions of the connection cores 23 may be separated from each other at the time of press-fitting, and the connection cores 23 may be separated.

At this point, when there is a protruding portion 23g, as shown in FIG. 17C, the protruding portion 23g receives a reaction force as indicated by an arrow from the housing side, and as a result, a force that press the contact portion 23c and the contact portion 23d in the peripheral direction acts, so that each connection core 23 is more firmly connected. Further, the contact portions 23c and 23d of the end portions of the connection cores 23 respectively have an uneven shape in the peripheral direction, and by fitting each other, the pressing force in the peripheral direction is strengthened. However, even if the contact portions 23c and 23d have flat end surfaces, a sufficient pressing force can be secured because a frictional force acts. It is to be noted that, the press-fitting may be performed without using a special jig, or may be performed by a jig as described with reference to FIG. 14A and FIG. 14B. Further, the elastic member 291 shown in FIG. 16A and FIG. 16B may be used in combination.

In this way, since a force that presses the connection core 23 itself against the housing is generated by the protruding portion 23g, it is easy to obtain circularity consistent with the circularity of the inner surface of the housing.

Eighth Embodiment

In the eighth embodiment, a method for maintaining a good circularity when a plurality of connection cores 23 are assemble in an annular shape is presented by a method different from the embodiments described above. That is, in the seventh embodiment described above, the diameter of the outermost peripheral surface is increased by the protruding portion 23g when the connection core 23 is bent in a circular arc shape, but in the eighth embodiment, the curvature of the outer peripheral surface of the piece 23a is reduced to make the outer shape of the outermost peripheral portion larger than that of the other portions.

Figure 18:
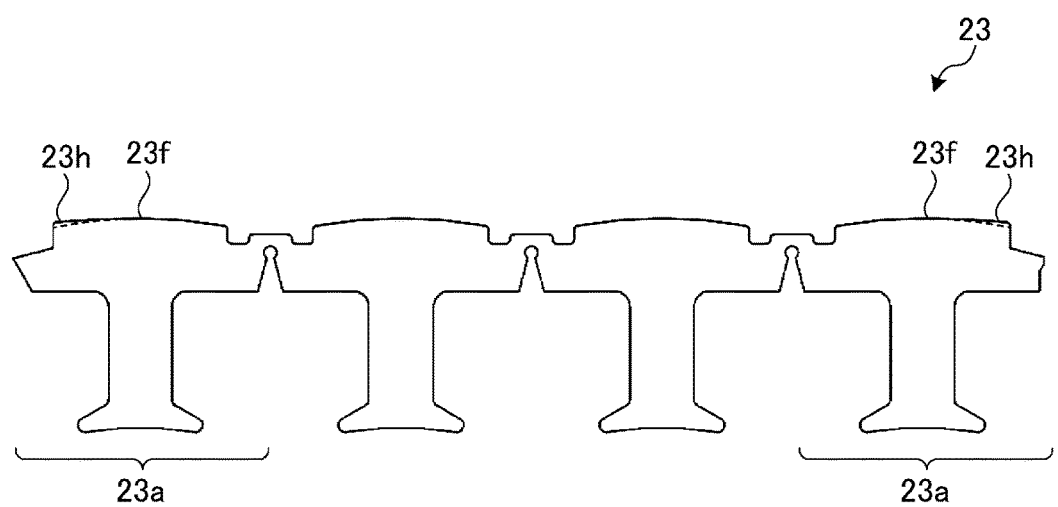
FIG. 18 is a diagram showing an example of a jutting portion according to an eighth embodiment.

FIG. 18 is a diagram showing an example of a jutting portion 23h according to the eighth embodiment, and shows a band-shaped connection core 23 before being bent. In FIG. 18, circular arc portions 23f serving as curved portions are formed at the upper portions of the pieces 23a which are the left and right end portions of the connection core 23, and the circular arc portions 23f become jutting portions 23h jutting out toward the tubular portion of the housing. The curvature of the jutting portion 23h is changed to be small. The broken line indicates the circular arc portion 23f when the curvature is not changed. The merit of the jutting portion 23h is the same as that of the protruding portion 23g in FIG. 17A to FIG. 17C. Further, the plurality of connection cores 23 may include a piece 23a having the circular arc portion, and a piece 23a having a jutting portion with a curvature different from the curvature of the circular arc portion.

Ninth Embodiment

In the ninth embodiment, a method for maintaining a good circularity when a plurality of connection cores 23 are assemble in an annular shape is presented by a method different from the embodiments described above.

Figure 19:
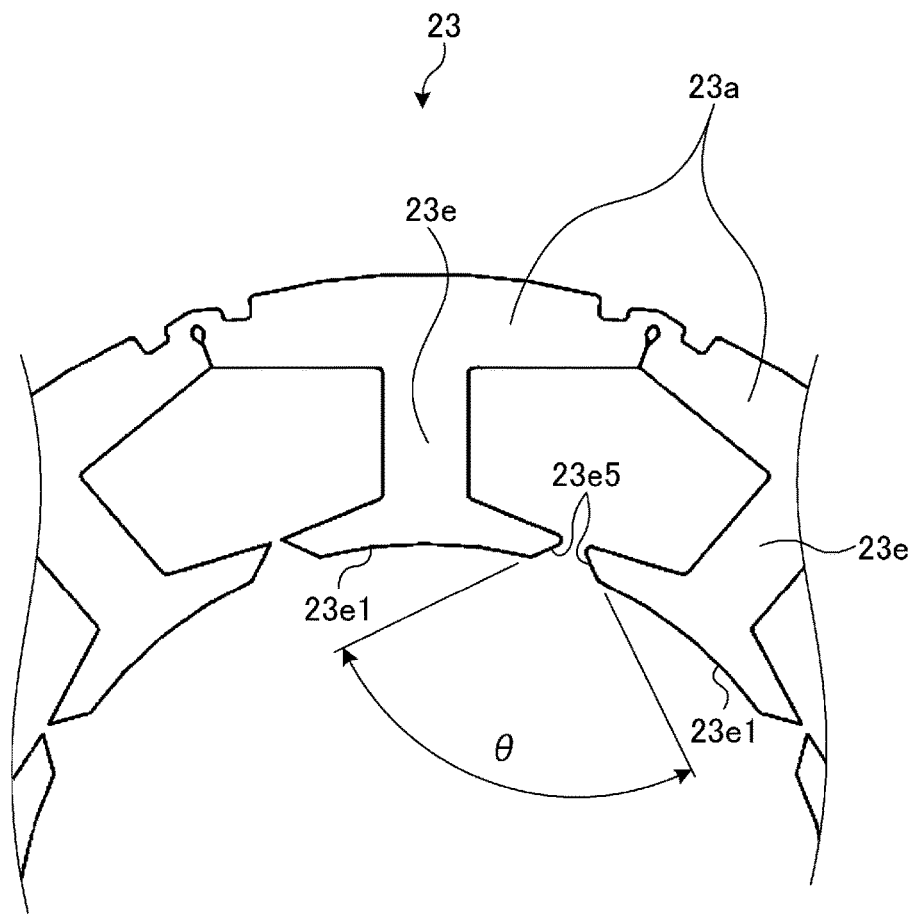
FIG. 19 is a diagram showing an example of a state in which a connection core is assembled in an annular shape according to a ninth embodiment.

FIG. 19 is a diagram showing an example of a state in which a connection core according to the ninth embodiment is assembled in an annular shape. It is to be noted that, although the case where the illustrated connection core 23 is configured by three pieces 23a is taken as an example, it may be configured by four or other number of pieces 23a as shown in FIG. 3A or the like. Further, the assembly to the annular shape is performed after the coil is wound, but the illustration of the coil is omitted for the sake of simplicity.

In FIG. 19, flat portions 23e5 that come into contact with the wedge-shaped protrusions of the jig at the time of assembly are provided at both ends of the end portion 23e1 of the tooth 23e of each of the pieces 23a constituting the connection core 23. Further, an angle formed by the flat portions 23e5 of the adjacent pieces 23a is opened with respect to the central axis side, and when the angle is referred to as a magnetic pole end angle θ, the magnetic pole end angle θ is preferably no less than 30 degrees and no greater than 120 degrees, and more specifically, no less than 60 degrees and no greater than 100 degrees.

Figure 20:
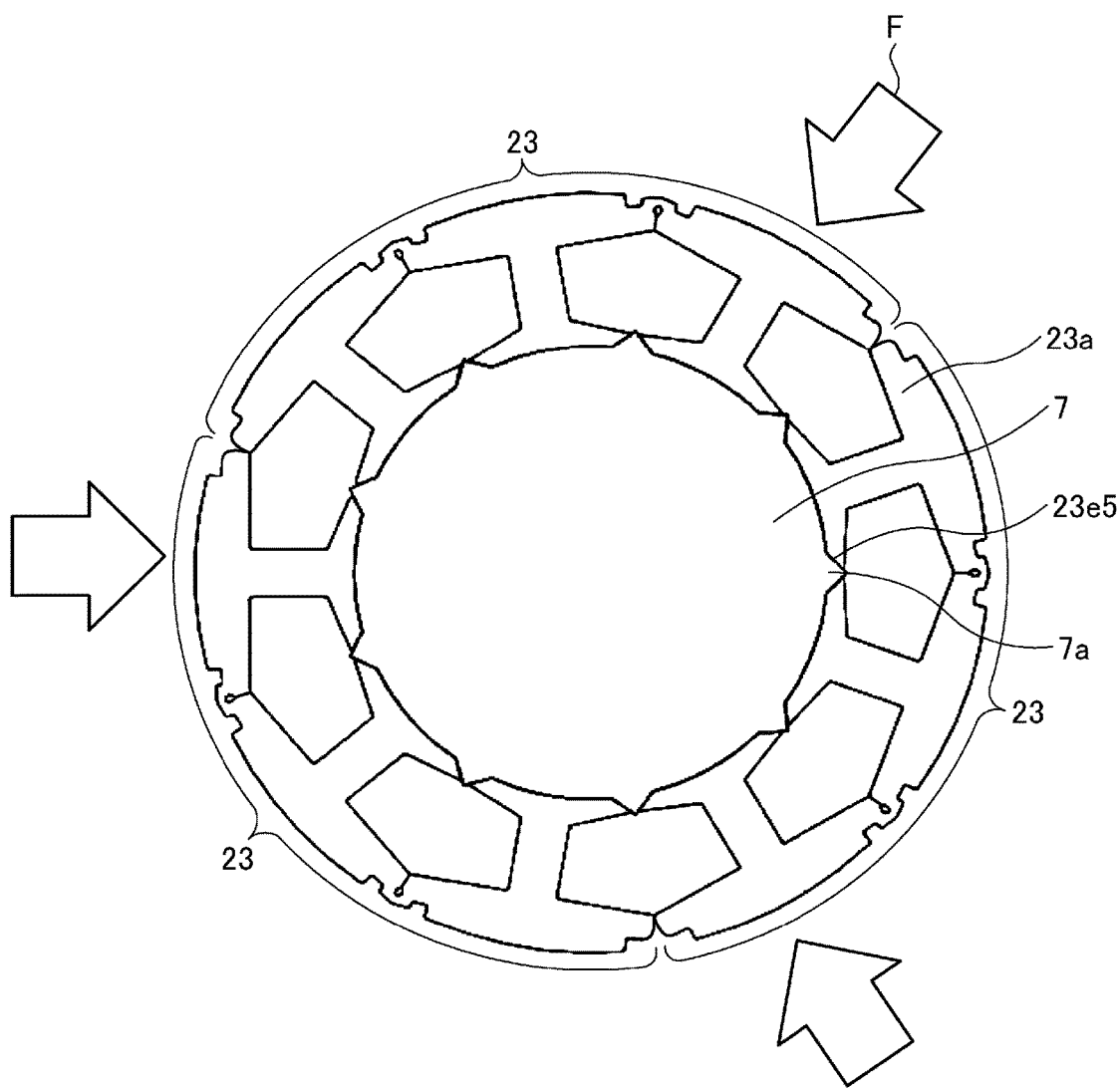
FIG. 20 is a diagram showing a state in which a plurality of connection cores are assembled in an annular shape.

FIG. 20 is a diagram showing a state in which a plurality of connection cores 23 are assembled in an annular shape. In FIG. 20, centering on a shaft rod 7 provided with a plurality of wedge-shaped protrusions 7a at equal intervals on the outer periphery, a plurality of connection cores 23 are combined at the outer periphery of the shaft rod 7. The apex angle of the wedge-shape of the protrusion 7a of the shaft rod 7 is made to match the above-mentioned magnetic pole end angle θ, and the flat portion 23e5 of each piece 23a is arranged so as to be in contact with the inclined surface of the wedge-shape of the protrusion 7a of the shaft rod 7. Then, a clamping force in the radial direction as shown by the arrows F is applied to the outer peripheral surface of the connection core 23 by a mold (not shown), so that the flat portion 23e5 of each piece 23a is invited by the wedge-shaped protrusion 7a of the shaft rod 7, and the circularity the annular core by the plurality of connection cores 23 is increased. Then, the three connection cores 23 are integrally fixed by resin molding or the like.

Tenth Embodiment

In the tenth embodiment, a method for maintaining a good circularity when a plurality of connection cores 23 are assemble in an annular shape is presented by a method different from the embodiments described above.

Figure 21A:
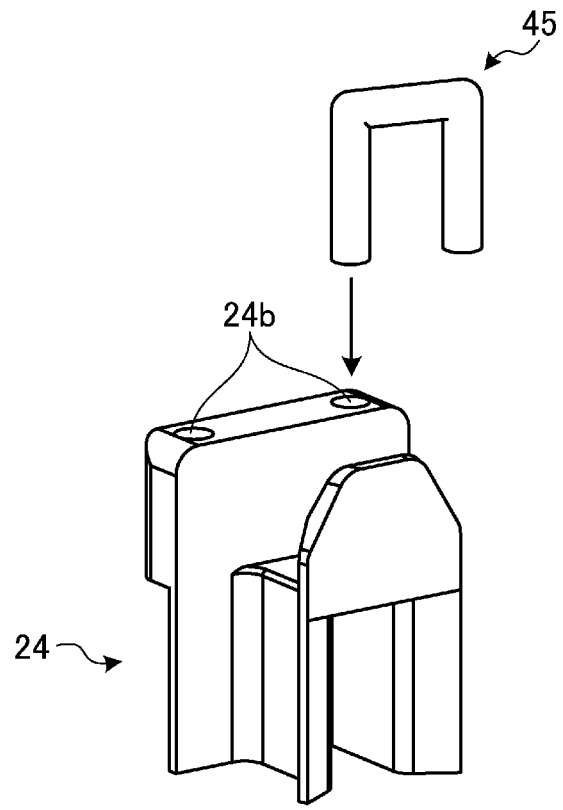
FIG. 21A is a diagram (1) showing an example of a temporary assembly of a stator according to a tenth embodiment.
Figure 21B:
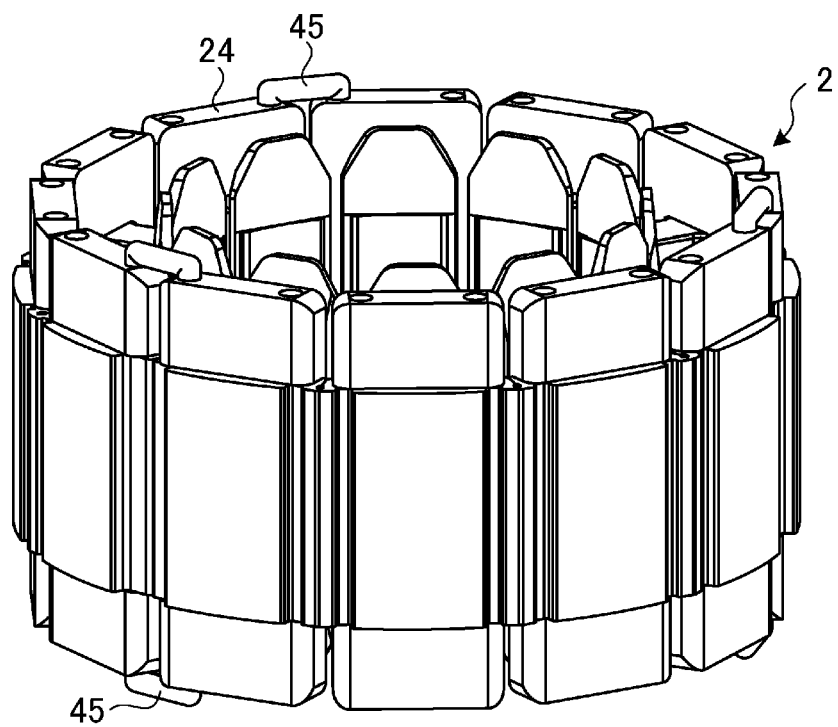
FIG. 21B is a diagram (2) showing an example of a temporary assembly of the stator according to the tenth embodiment.

FIG. 21A and FIG. 21B are diagrams showing an example of a temporary assembly of the stator 2 according to the tenth embodiment. FIG. 21A shows the upper side insulator 24. In a rotation axis direction, hole portions (hereinafter, referred to as connection fitting insertion holes) 24b into which the connection fitting 45 as a connection member is inserted are provided at the left and right of the upper portion of the upper side insulator 24. It is to be noted that the hole for the terminal 27 is not shown. Further, although the illustration of the lower side insulator 25 is omitted, connection fitting insertion holes into which the connection fitting 45 is inserted are also provided in the lower portion of the lower side insulator 25. Further, the connection fitting insertion holes 24b need to be provided only for the piece 23a as the end portion of the connection core 23, but from the viewpoint of productivity, the upper side insulator 24 and lower side insulator 25 are configured uniformly to have the same structure. However, if it is permissible to prepare two types of upper side insulators 24 and lower side insulators 25, respectively, the upper side insulator 24 and the lower side insulator 25 in which the connection fitting insertion holes 24b are provided may be used only for the piece of the end portion of the connection core 23.

When temporarily assembling the stator 2, as shown in FIG. 21B, a connection fitting 45 is inserted across the upper side insulators 24 and the lower side insulators 25 of two connection cores 23 that are in contact with each other at the end portions, and the plurality of connection cores 23 are connected. The connection fitting 45 is removed after the stator 2 is arranged in the housing by press-fitting or the like.

In this way, when the plurality of connection cores 23 are temporarily assembled in an annular shape, the circularity can be ensured by fixing them with the connection fittings 45.

Eleventh Embodiment

In the eleventh embodiment, a method for maintaining a good circularity when a plurality of connection cores 23 are assemble in an annular shape is presented by a method different from the embodiments described above.

Figure 22A:
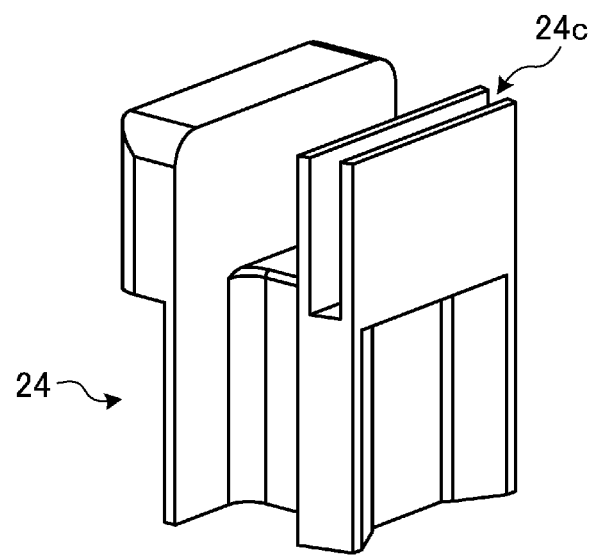
FIG. 22A is a diagram (1) showing an example of a temporary assembly of a stator according to an eleventh embodiment.
Figure 22B:
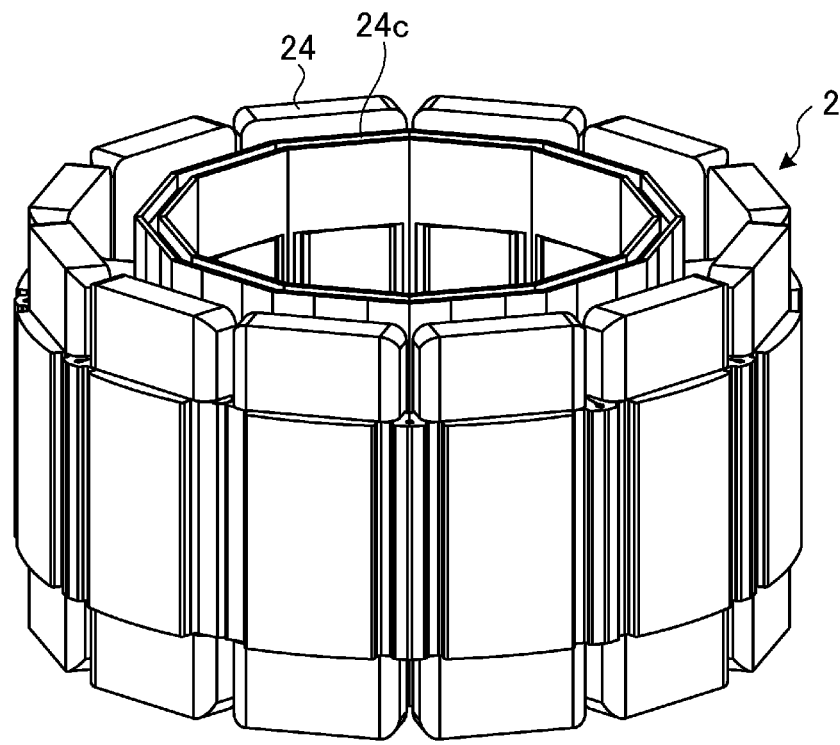
FIG. 22B is a diagram (2) showing an example of a temporary assembly of the stator according to the eleventh embodiment.

FIG. 22A and FIG. 22B are diagrams showing an example of a temporary assembly of the stator according to the eleventh embodiment. FIG. 22A shows the upper side insulator 24. A groove portion (hereinafter, referred to as an adhesive filling groove) 24c having one end opened in the rotation axis direction is provided on the upper portion of the upper side insulator 24. This groove portion extends in the peripheral direction. It is to be noted that the hole portion for the terminal is not shown. Further, the lower side insulator 25 is the same as that shown in FIG. 5.

As shown in FIG. 22B, after the stator 2 is temporarily assembled, a thermosetting adhesive or a two-liquid adhesive is poured into the annular groove portion formed by a plurality of adhesive filling grooves 24c, and is solidified with the plurality of connection cores 23 maintaining the annular shape.

In this way, when the plurality of connection cores 23 are temporarily assembled in an annular shape, the plurality of connection cores 23 bent in an annular shape can be fixed by solidifying the adhesive while maintaining the circularity, and the circularity can be ensured.

Twelfth Embodiment

In FIG. 5, although an example of the terminal 27 mounted on the upper side insulator 24 has been described, the needs required for the terminal differ depending on the application. For example, at the terminal, one hook for wire connection that connects the winding start or the winding end of the coil for each piece, and further, one additional wiring hook for routing the jumper wire that connects the coils of each piece may be required. When two hooks are required, a large space is required for the terminals, and there is a disadvantage that the terminals cannot be accommodated in the narrow space inside the housing.

Figure 23:
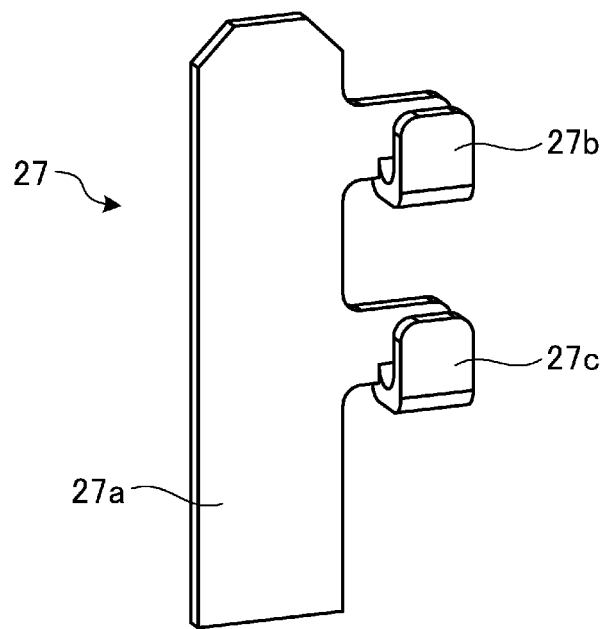
FIG. 23 is a perspective view showing an example of a terminal according to a twelfth embodiment.
Figure 24:
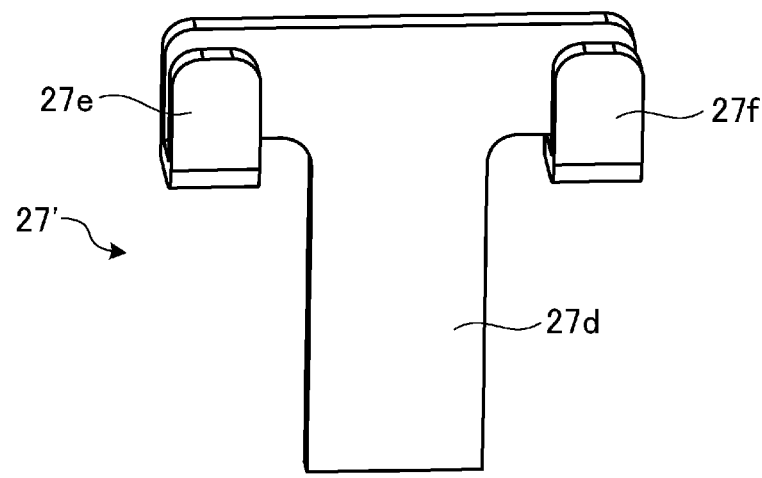
FIG. 24 is a perspective view showing an example of a general terminal according to a comparative example.

FIG. 23 is a perspective view showing an example of the terminal 27 according to the twelfth embodiment. Hooks 27b and 27c are provided in upper and lower two stages on one side of one end portion 27a of the terminal extending in the rotation axis direction. FIG. 24 is a perspective view showing an example of a general terminal 27' according to a comparative example. Hooks 27e and 27f are provided at both end portions extending in the peripheral direction at the upper portion of one end portion 27d of the terminal extending in the rotation axis direction, In the present embodiment of FIG. 23, at the terminal 27, the hooks 27b and 27c are provided in upper and lower two stages and on the same side, so that the entanglement of the winding is completed in a small space in the housing, and the space in the housing can be effectively used.

Thirteenth Embodiment

A type of terminal that entangles the end portion of the lead wire with a hook may require an engaging portion (hereinafter, referred to as a retaining pin) for hooking the lead wire at the winding start and the winding end. Generally, a retaining pin is provided outside the core (including the connection core 23) in which the wire is wound, for example, on an outer frame jig, and in a special case, a retaining pin may be provided as a part of the insulator covering the core. However, when the retaining pin is provided outside the core, handling of the outer frame jig becomes necessary up to the process such as welding for the wire connection, and a dedicated winding outer frame jig is required for each core. Further, when the insulator is provided with a retaining pin, there is often almost no space around the retaining pin, and the winding itself is restricted, which makes the winding difficult. The present embodiment presents the solution.

Figure 25:
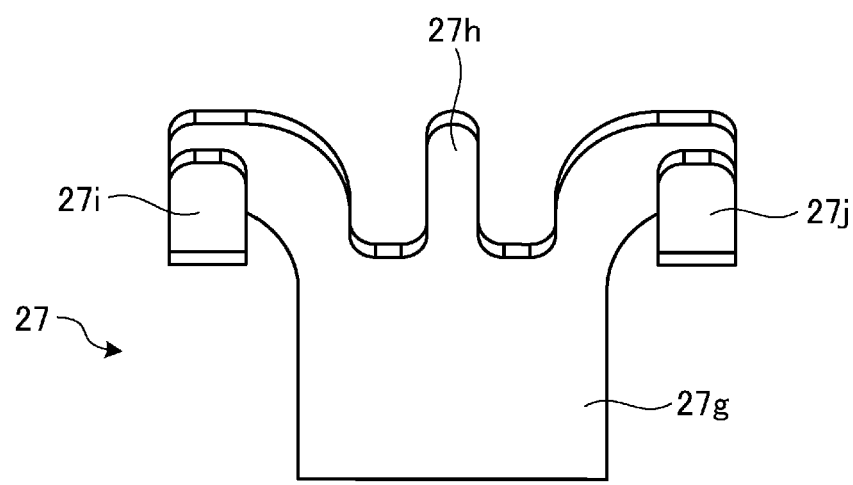
FIG. 25 is a perspective view showing an example of a terminal according to a thirteenth embodiment.

FIG. 25 is a perspective view showing an example of the terminal 27 according to the thirteenth embodiment. A retaining pin 27h is provided at the center portion of the upper portion of one end portion 27g of a terminal extending in the vertical direction (direction from the insulator toward the cover portion), and hooks 27i and 27j are provided at both wings of the upper portion. In the present embodiment, since there is a retaining pin 27h on the terminal 27, the retaining and entanglement of the winding wire is completed in a small space on the terminal 27. That is, at the time of winding, the retaining pin 27h for winding start and winding end is located at the terminal 27, so that a winding jig is not required. Further, since it is not necessary to provide a retaining pin at the insulator, the availability of the space occupied by the insulator in the housing is increased.

Fourteenth Embodiment

Figure 26:
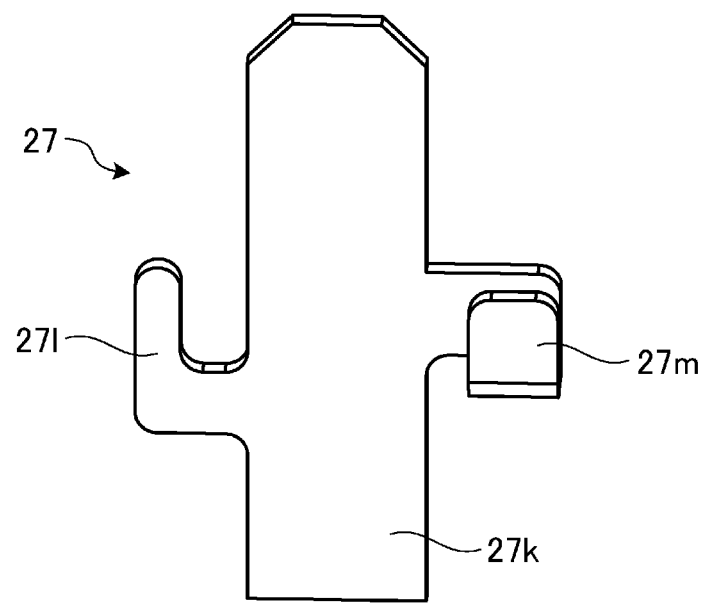
FIG. 26 is a perspective view showing an example of a terminal according to a fourteenth embodiment.

The fourteenth embodiment shows another example of the terminal 27 including a retaining pin. FIG. 26 is a perspective view showing an example of the terminal 27 according to the fourteenth embodiment. A retaining pin 27l is provided on one side of an end portion 27k extending in the vertical direction (direction from the insulator toward the cover portion), and a hook 27m is provided on the other side. In the present embodiment, since there is a retaining pin 27l on the terminal 27, the retaining and entanglement of the winding wire is completed in a small space on the terminal 27. That is, at the time of winding, the retaining pin 27*l* for winding start and winding end is located at the terminal 27, so that a winding jig is not required. Further, since it is not necessary to provide a retaining pin at the insulator, the availability of the space occupied by the insulator in the housing is increased.

Fifteenth Embodiment

As for the connection core 23 having the configuration as described with reference to FIG. 3A, after the coil is wound around each piece, and the connection core 23 is temporarily assembled in an annular shape, the coil of each piece needs to be connected to a desired circuit. The wire connection required a method of high cost, such as using a printed circuit board or a bus bar. The present embodiment presents the solution.

Figure 27:
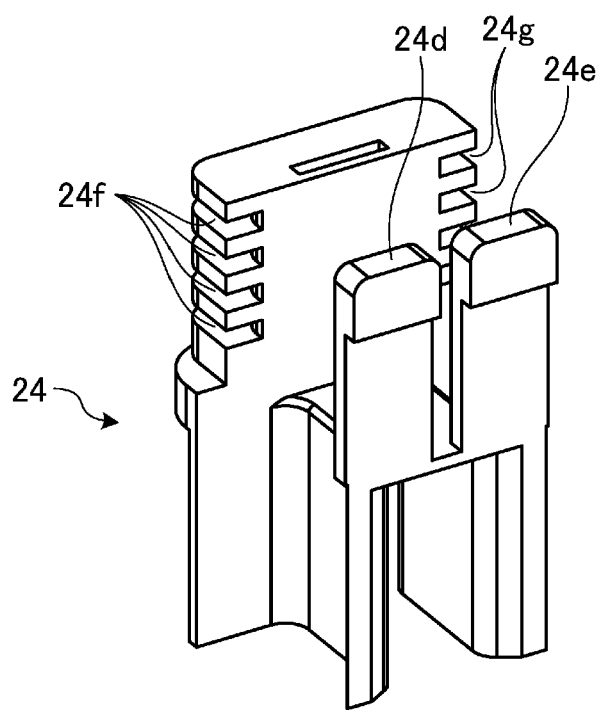
FIG. 27 is a perspective view showing an example of an upper side insulator according to a fifteenth embodiment.

FIG. 27 is a perspective view showing an example of an upper side insulator 24 according to the fifteenth embodiment. In FIG. 27, hooks 24*d* and 24*e* for assisting the jumper wire on the tooth side of the stator are provided at the upper portion of the upper side insulator 24 so as to extend in the vertical direction (direction from the insulator toward the cover portion). Further, a plurality of groove portions 24*f* and 24*g* for guiding the jumper wire are provided on both sides of the upper portion of the upper side insulator 24.

In use, in the wire connection after winding the coil of each piece, for example, a jumper wire from the pieces of the same phase facing each other in the peripheral direction is passed through the groove portion 24*f* of the outer peripheral portion and retained (entangled) at the hook 24*d* or the hook 24*e*, and connected to the terminal 27 (not shown) arranged above the upper side insulator 24. By such a method, the jumper wire can be accommodated more smoothly without the need for components such as a printed circuit board and a bus bar, and the superiority of the connection core can be fully exhibited.

Sixteenth Embodiment

In the connection core 23 having the configuration as described with reference to FIG. 3A, since the coil can be wound with the piece 23*a* open, the coil may be required to be wound as much as possible. It is also an advantage of the connection core 23 that this is possible, but when the plurality of connection cores 23 are bent and assembled in an annular shape after the coil is wound, there is a concern that the coils wound to the limit will be pressed against each other, and the coating of the coil might be broken and a short circuit might occur. The present embodiment presents the solution.

Figure 28A:
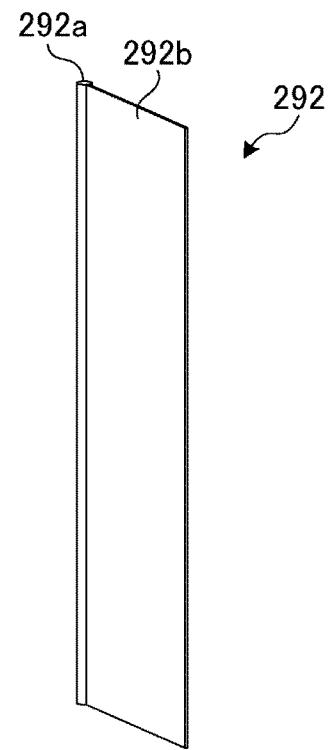
FIG. 28A is a diagram (1) showing an example of insertion of a partition plate according to a sixteenth embodiment.
Figure 28B:
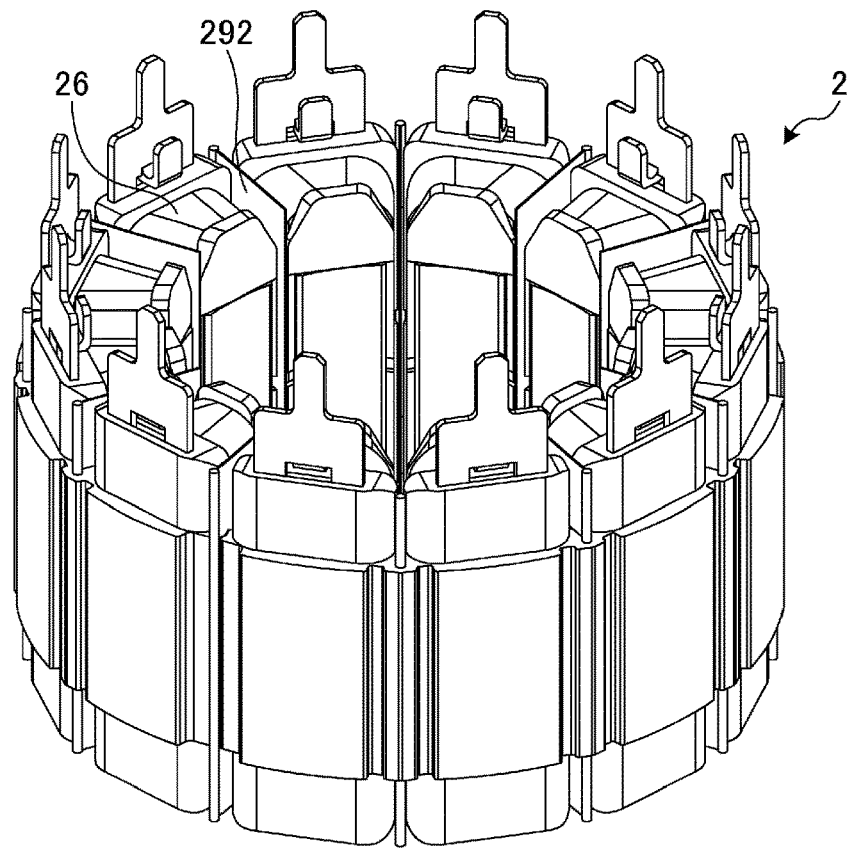
FIG. 28B is a diagram (2) showing an example of insertion of a partition plate according to the sixteenth embodiment.

FIG. 28A and FIG. 28B are diagrams showing an example of insertion of a plate (hereinafter, referred to as a partition plate) 292 according to the sixteenth embodiment. FIG. 28A shows a partition plate 292 formed of an elastic member such as rubber, and a rod-shaped portion 292*a* extending in the vertical direction and a rectangular flat plate portion 292*b* are integrally formed.

In use, the rod-shaped portion 292*a* of the partition plate 292 is inserted into the curved recess portion (23*b-b*) of the connection portion 23*b* of the connection core 23 around which the coil 26 is wound, and the flat plate portion 292*b* is arranged between the side surfaces of the adjacent coils 26. FIG. 28B shows a state in which the partition plate 292 is arranged in the stator 2. Thereby, even if the plurality of connection cores 23 are bent and assembled in an annular shape, the coils 26 do not come into direct contact with each other, short circuit is prevented, and the superiority of connection cores can be fully exhibited.

Seventeenth Embodiment

As measures against the temperature rise due to the electric current of the coil of the stator, there are varnish impregnation in the stator (see, for example, Japanese Unexamined Patent Application Publication No. 2018-74827, etc.), resin mold (see, for example, Japanese Unexamined Patent Application Publication No. 2009-50048, etc.) and the like, but there is a problem that equipment and man-hours are required. In the seventeenth embodiment, a method of measures against temperature rise is presented without spending equipment and man-hours.

Figure 29:
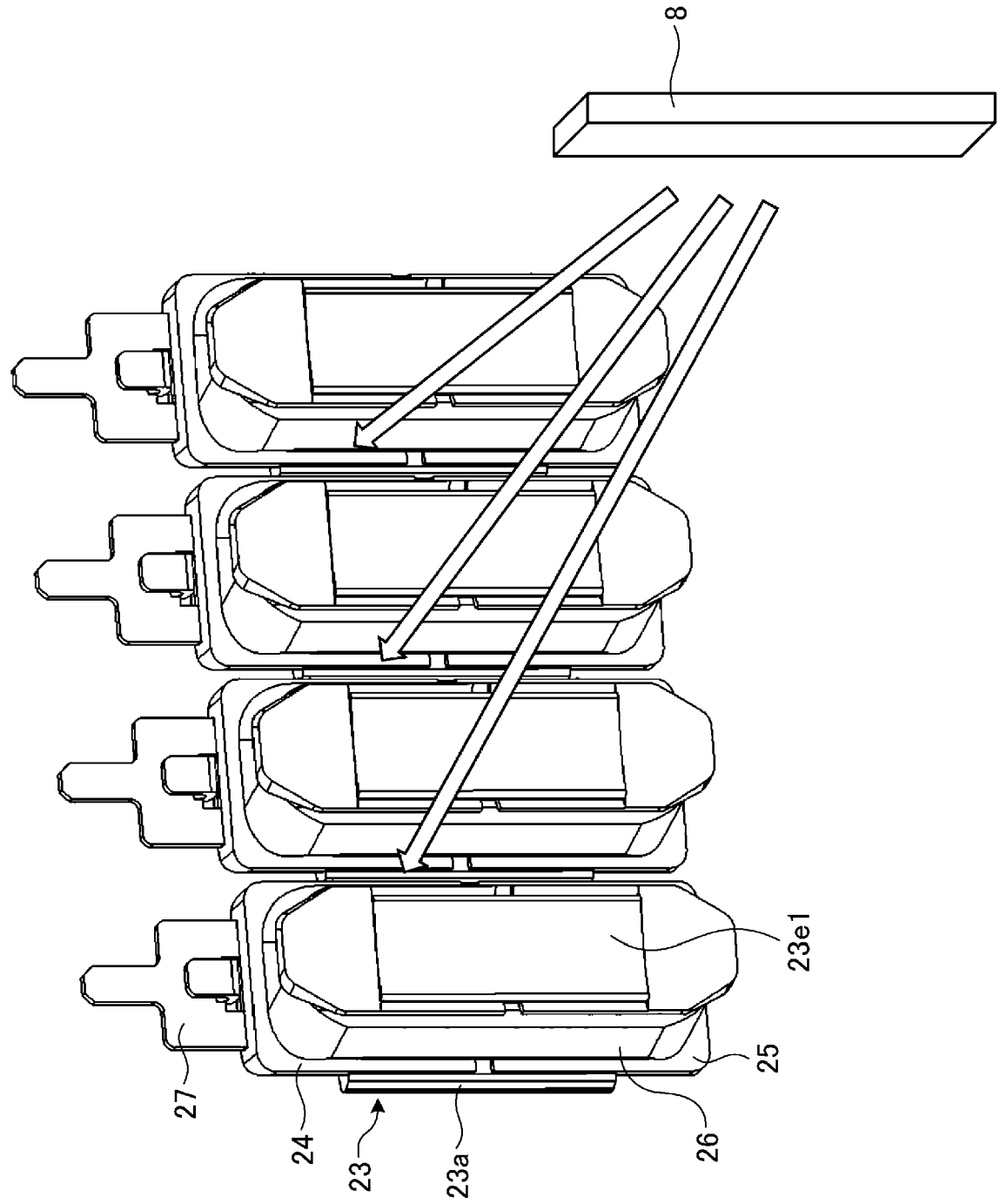
FIG. 29 is a diagram showing an example of measures against temperature rise according to a seventeenth embodiment.
Figure 30:
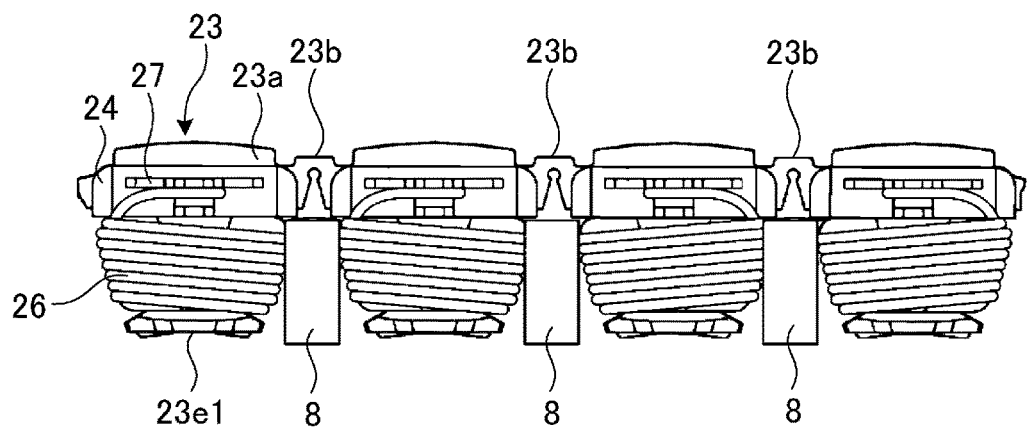
FIG. 30 is a top view showing a state in which sheet-shaped resin members are inserted between adjacent coils.

FIG. 29 is a diagram showing an example of measures against temperature rise according to the seventeenth embodiment. In FIG. 29, the upper side insulator 24, the lower side insulator 25 and the terminal 27 are mounted and the coils 26 are wound on each of the pieces 23*a* of the linear connection core 23 before bending, and a state in which the sheet-shaped resin members are sandwiched between the coils 26 is shown. The sheet-shaped (plate-shaped) resin member is a member (sheet) 8 made of a gel having a high thermal conductivity. Examples of the gel include a gel having viscosity, a colloid gel, a gel having low fluidity, and a gel made of a resin material such as silicone. FIG. 30 is a top view showing a state in which sheet-shaped resin members are inserted between the adjacent coils 26.

Figure 31:
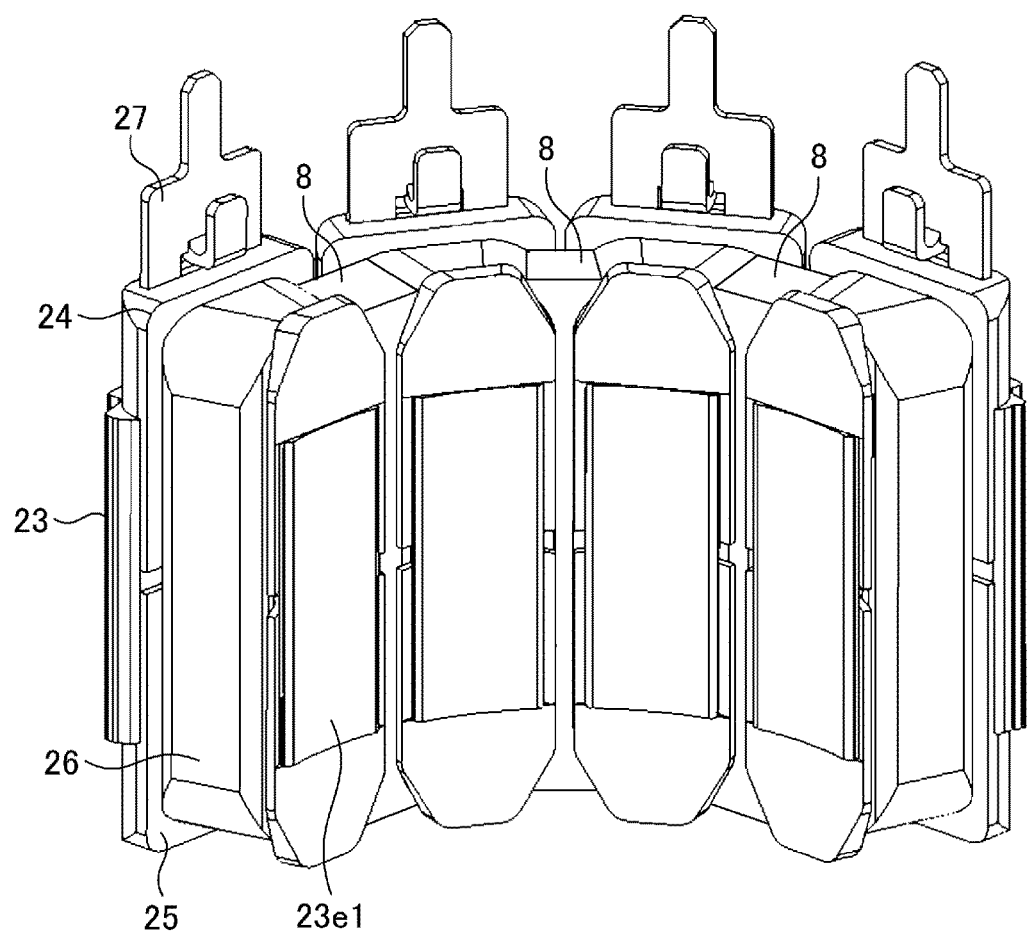
FIG. 31 is a diagram showing a state in which the connection core is bent with the sheet-shaped resin members inserted.

FIG. 31 is a diagram showing a state in which the connection core 23 is bent with the sheet-shaped resin members 8 inserted. When the connection core 23 is bent in a circular arc shape, the sheet-shaped resin members 8 sandwiched between the coils 26 are crushed, and the coils 26 and the sheet-shaped resin members 8 come into close contact with each other. By doing so, the air region between the coils 26 having low thermal conductivity is filled with the sheet-shaped resin member 8, so that the heat dissipation can be improved. It is to be noted that, the sheet-shaped resin member 8 is also provided between the coils 26 of the end portions of the adjacent connection cores 23 that are combined in an annular shape, and the sheet-shaped resin member 8 may be crushed when the annular shape is formed.

Although the embodiments of the present disclosure have been described above, the present disclosure is not limited to the above embodiments, and various modifications can be made without departing from the spirit of the present disclosure.

For example, a plurality of coils 26 may be connected in parallel by the connecting plate 28 shown in FIG. 1. Since parallel connection can be easily performed by using the connecting plate 28, it is possible to realize an equivalently thick electric wire by parallel connection of winding wires without using a thick winding wire to enable operation with large currents, and it is possible to suppress a reduction in the space factor of the winding wire, an increase in the resistance of the winding wire, an increase in thermal resistance, and an increase in the size of the coil end caused by using the thick winding wire.

The motor according to the embodiment includes a stator. The stator includes a plurality of connection cores. The connection core includes a plurality of pieces connected via connection portions. The plurality of pieces are arranged in a circular arc shape, and the plurality of connection cores are arranged in an annular shape. Thus, it is possible to reduce the vibration of the stator and improve the productivity.

Further, the stator includes three connection cores, and the connection core includes four pieces. Thereby, it is possible to provide a more specific configuration.

Further, a connecting plate to which a coil wound around the piece is electrically connected is included. Thereby, the wire connection can be easily performed, and the dead space of the motor can be reduced by eliminating the need for a guide portion that guides the jumper wire. In addition, it is possible to realize an equivalently thick electric wire by the parallel connection of winding wires, and it is possible to operate with large currents.

Further, in a peripheral direction, coils wound around two pieces of the plurality of pieces have the same winding direction. As a result, since the coils can be wound simultaneously for a plurality of connection cores, the productivity is greatly improved.

Further, the connection core includes four pieces. In the peripheral direction, among the plurality of pieces, the winding direction of coils wound around two pieces located at both ends is one direction, and the winding direction of coils wound around two pieces located between both ends is an opposite direction to the one direction. Thereby, it is possible to provide a more specific configuration.

Further, the connection core is formed of a grain-oriented electrical steel sheet. The magnetization hard axis direction of the grain-oriented electrical steel sheet is a direction from one connection portion toward the other connection portion among the plurality of connection portions of the connection core 23. As a result, magnetic saturation of the connection portion is prevented, and unnecessary heat generation due to magnetic loss is suppressed.

Further, among the plurality of connection cores, two connection cores that are in contact with each other respectively include contact portions, and the contact portions of the two connection cores are provided with surfaces intersecting a surface extending in the radical direction and passing through the center of the shaft. Thereby, the contact portions are engaged with each other to prevent deviation in the radial direction, and the circularity of the stator can be improved.

Further, the number of the pieces included in the plurality of connection cores is an even number, and the number of the plurality of connection cores is an odd number or a prime number. This makes it easier to implement.

A method for manufacturing the motor according to the embodiment includes: arranging a connection core including a plurality of pieces connected via connection portions in a circular arc shape; and arranging a plurality of connection cores including the connection core in an annular shape. Thus, it is possible to reduce the vibration and noise of the stator and improve the productivity.

Further, end portions of the plurality of connection cores arranged in an annular shape are held by a contact portion of a jig, and the plurality of connection cores held are press-fitted in a housing. More specifically, while inserting the tip end of the contact portion into the tubular portion of the housing, the plurality of connection cores are press-fitted into the tubular portion. Thus, a highly accurate stator can be manufactured in a short time.

Further, surfaces of contact portions of the two pieces on both sides of the connection core are arranged in a direction perpendicular to a direction in which the plurality of pieces are lined up, and a coil is wound around to the connection core. Thereby, the coil can be wound around each of the pieces of the connection core 23 with a predetermined tension by a winding machine, and the occupancy rate of the coil can be increased.

Further, the motor includes a stator. The stator includes a plurality of connection cores. The connection core includes a plurality of pieces connected via connection portions. The side portion of the connection portion includes a recess portion. Also, the plurality of connection cores are arranged in an annular shape and an elastic member is arranged in the recess portion. Thus, it is possible to reduce the vibration and noise of the stator and improve the productivity. That is, the elastic member exerts a force for spreading the piece to press the plurality of connection cores against the inner peripheral surface of the housing. Thereby, the stator has a circularity equivalent to the circularity of the inner periphery of the housing.

Further, the elastic members are arranged in the recess portions of the plurality of connection cores. As a result, the elastic members can be arranged uniformly, and the circularity can be realized.

Further, the elastic members are arranged in a part of the recess portions of the plurality of connection cores. As a result, the circularity can be realized by minimizing the number of the elastic members used.

Further, the motor includes a housing, and the outer peripheral portions of the plurality of pieces come into contact with the inner surface of the housing. Thereby, a stator having a circularity equivalent to the circularity of the inner periphery of the housing is realized.

Further, projecting portions are provided on the outer peripheral portions of two pieces at both ends of the connection core among the plurality of pieces. Thereby, it is possible to prevent the connection cores from falling apart during assembly, and the circularity can be maintained.

Further, an elastic member is arranged on the inner side of the recess portion of the connection portion, and a plurality of connection cores including a plurality of pieces connected via the connection portions are arranged in a circular arc shape. Thus, it is possible to reduce the vibration and noise of the stator and improve the productivity.

Further, the plurality of connection cores arranged in an annular shape are press-fitted into the housing. Thereby, the stator can be easily attached.

Further, the motor includes a stator. The stator includes a plurality of connection cores. The connection core includes a plurality of pieces connected via connection portions. Projecting portions are provided on the outer peripheral portions of two pieces at both ends of the connection core among the plurality of pieces. Also, the plurality of connection cores are arranged in an annular shape. The protruding portion 23g and the jutting portion 23h are examples of the protruding portions, respectively. Thus, it is possible to reduce the vibration and noise of the stator and improve the productivity. That is, the connection cores are more firmly contacted with each other by the projecting portions, so that the connection cores will not fall apart and the circularity can be improved.

Further, the projecting portion is a jutting portion jutting out from the outer peripheral portion of the piece. Thereby, the projecting portion can be easily configured.

Further, the motor includes a housing, and the projecting portion comes into contact with the inner surface of the housing. Thereby, firm contact between the connection cores is realized.

Further, the side portion of the connection portion includes a recess portion, and an elastic member is arranged on the inner side of the recess portion. Thereby, the circularity of the stator can be improved.

Further, in a connection core including a plurality of pieces connected via connection portions, and in a connection core including a plurality of pieces connected via connection portions at both ends of the connection core, among the plurality of pieces, projecting portions are provided on the outer peripheral portions of two pieces at both ends of the connection core. A plurality of connection cores including the connection core are arranged in an annular shape. Thus, it is possible to reduce the vibration and noise of the stator and improve the productivity.

Further, the present disclosure is not limited to the above embodiments. The present disclosure also includes configurations in which the above-mentioned components are appropriately combined. In addition, further effects and modifications can be easily derived by those skilled in the art. Therefore, the broader aspects of the present disclosure are not limited to the above-described embodiments, and various modifications can be made.

This application enjoys the benefits of Japanese Patent Application No. 2018-157659 filed in Japan on Aug. 24, 2018, Japanese Patent Application No. 2018-157660 filed in Japan on Aug. 24, 2018, and Japanese Patent Application No. 2018-157661 filed in Japan on Aug. 24, 2018.

DESCRIPTION OF REFERENCE NUMERALS 1 motor; 11 tubular portion; 2, 21 stator; 23 connection core; 23a piece; 23b connection portion; 23b-b recess portion; 23e5 flat portion; 23g protruding portion; 23h jutting portion; 23i groove; 26 coil; 28 connecting plate; 291 elastic member; 3 rotor; 32 shaft; 42 stator holding jig; 43 contact portion; 8 sheet-shaped resin member; 9 grain-oriented electrical steel sheet; W lead wire; θ magnetic pole end angle.

What is claimed is:

1. A motor comprising a stator, wherein
the stator comprises a plurality of connection cores, a plurality of insulators and a plurality of coils,
the connection core comprises a plurality of pieces connected via connection portions,
the plurality of insulators are mounted on the plurality of pieces,
the plurality of coils are wound around the plurality of insulators,
the plurality of pieces are arranged in a circular arc shape, and
the plurality of connection cores are arranged in an annular shape,
the plurality of insulators include two insulators connected in a peripheral direction by a connection member and two insulators divided in a peripheral direction.

2. The motor according to claim 1, wherein
the stator comprises three connection cores, and
the connection core comprises four pieces.

3. The motor according to claim 1, comprising
a plurality of terminals provided at the plurality of insulators, and
a connecting plate provided at the plurality of terminals,
the connecting plate is electrically connected with the coils via the terminals.

4. The motor according to claim 1, wherein
in a peripheral direction, coils wound around two pieces of the plurality of pieces have a same winding direction.

5. The motor according to claim 4, wherein
the connection core comprises four pieces, and
in the peripheral direction, among the plurality of pieces, a winding direction of coils wound around two pieces located at both ends is one direction, and a winding direction of coils wound around two pieces located between the both ends is an opposite direction to the one direction.

6. The motor according to claim 1, wherein
the connection core is formed with a grain-oriented electrical steel sheet, and
a magnetization hard axis direction of the grain-oriented electrical steel sheet is a direction from one connection portion toward the other connection portion among the plurality of connection portions of the connection core.

7. The motor according to claim 1, wherein
among the plurality of connection cores, two connection cores that are in contact with each other respectively comprise contact portions, and
the contact portions of the two connection cores are provided with surfaces intersecting a surface extending in a radial direction and passing through a shaft.

8. The motor according to claim 1, wherein
a number of the pieces of the plurality of connection cores is an even number, and
a number of the plurality of connection cores is an odd number or a prime number.

* * * * *